(12) United States Patent
Lee et al.

(10) Patent No.: US 9,008,190 B2
(45) Date of Patent: Apr. 14, 2015

(54) APPARATUS FOR PROCESSING IMAGES AND METHOD THEREOF

(75) Inventors: Kun-Sik Lee, Pyeongtaek-si (KR);
Yoon-Jung Kim, Pyeongtaek-si (KR);
Hae-Jin Bae, Pyeongtaek-si (KR);
Gyu-Seung Kim, Pyeongtaek-si (KR);
Sang-Chul Kim, Pyeongtaek-si (KR);
Sang-Kil Park, Pyeongtaek-si (KR);
Jae-Kyung Lee, Pyeongtaek-si (KR);
Jin-Gyeong Kim, Pyeongtaek-si (JP);
Tae-Il Chung, Pyeongtaek-si (KR)

(73) Assignee: LG Electronics, Inc., Seoul (KR)

( * ) Notice: Subject to any disclaimer, the term of this patent is extended or adjusted under 35 U.S.C. 154(b) by 557 days.

(21) Appl. No.: 12/651,730

(22) Filed: Jan. 4, 2010

(65) Prior Publication Data

US 2010/0194998 A1 Aug. 5, 2010

(30) Foreign Application Priority Data

Jan. 6, 2009 (KR) .................... 10-2009-0000660
Jan. 6, 2009 (KR) .................... 10-2009-0000661
Jun. 3, 2009 (KR) .................... 10-2009-0049193

(51) Int. Cl.
*H04N 7/18* (2006.01)
*H04N 21/4402* (2011.01)
*H04N 5/445* (2011.01)
*H04N 21/482* (2011.01)
(Continued)

(52) U.S. Cl.
CPC ....... *H04N 21/440263* (2013.01); *H04N 5/445* (2013.01); *H04N 21/482* (2013.01); *H04N 21/4263* (2013.01); *H04N 21/4755* (2013.01)

(58) Field of Classification Search
CPC .. H04N 7/50; H04N 7/26941; H04N 21/2365
USPC .................... 375/240.01–240.29; 725/37–45
See application file for complete search history.

(56) References Cited

U.S. PATENT DOCUMENTS 5,583,560 A 12/1996 Florin et al. .................... 348/7
7,076,151 B2 * 7/2006 Chotoku et al. .............. 386/241
(Continued)

FOREIGN PATENT DOCUMENTS

CN 101321254 A 12/2008
EP 1 096 793 A2 5/2001
(Continued)

OTHER PUBLICATIONS

PCT International Search Report dated May 25, 2010 issued in Application No. PCT/KR2010/000017.
(Continued)

*Primary Examiner* — Andy Rao
(74) *Attorney, Agent, or Firm* — Ked & Associates, LLP

(57) ABSTRACT

An apparatus for processing images may include a de-multiplexer that receives a data stream and de-multiplexes a video signal and channel information from the data stream, a first decoder that provides a decoded video signal, a thumbnail generator coupled to the first decoder to generate at least one of a still picture thumbnail or a moving picture thumbnail based on the decoded video signal, and an encoder coupled to the thumbnail generator and the de-multiplexer. The encoder encodes the thumbnail with the channel information to provide a thumbnail data stream to provide thumbnails of moving pictures and/or still pictures on a display.

16 Claims, 26 Drawing Sheets

(51) Int. Cl.
*H04N 21/426* (2011.01)
*H04N 21/475* (2011.01)

(56) References Cited

U.S. PATENT DOCUMENTS

| | | | | |
|---|---|---|---|---|
| 7,849,478 | B2* | 12/2010 | Aratani et al. | 725/37 |
| 2002/0166122 | A1 | 11/2002 | Kikinis et al. | 725/56 |
| 2005/0048916 | A1* | 3/2005 | Suh | 455/39 |
| 2005/0141856 | A1* | 6/2005 | Furuta | 386/46 |
| 2006/0064716 | A1* | 3/2006 | Sull et al. | 725/37 |
| 2008/0307458 | A1 | 12/2008 | Kim et al. | |
| 2009/0172543 | A1* | 7/2009 | Cronin et al. | 715/721 |

FOREIGN PATENT DOCUMENTS

| | | |
|---|---|---|
| KR | 10-2004-0067139 A | 7/2004 |
| KR | 10-2005-0001057 A | 1/2005 |
| KR | 10-2005-0077875 A | 8/2005 |
| KR | 10-2006-0015075 A | 2/2006 |
| KR | 10-2006-0031957 A | 4/2006 |
| KR | 10-2006-0094401 A | 8/2006 |
| KR | 10-2008-0011850 A | 2/2008 |
| KR | 10-2008-0035298 | 4/2008 |
| KR | 10-2008-0057486 A | 6/2008 |
| WO | WO 01/26367 | 4/2001 |
| WO | WO 2007/105876 | 9/2007 |

OTHER PUBLICATIONS

Chinese Office Action dated Jul. 3, 2013.
European Search Report issued in EP Application No. EP 10729271.6 dated Dec. 14, 2012.
European Search Report dated Jul. 15, 2014 issued in Application No. 10 729 271.6.
Korean Office Action dated Nov. 24, 2014, issued in Application No. 10-2009-0000660.
Korean Office Action dated Nov. 24, 2014, issued in Application No. 10-2009-0000661.
European Office Action for Application 10729271.6 dated Feb. 10, 2015.

* cited by examiner

APPARATUS FOR PROCESSING IMAGES AND METHOD THEREOF

CROSS-REFERENCE TO RELATED APPLICATIONS

The present application claims priority under 35 U.S.C. 119 and 35 U.S.C. 365 to Korean Patent Application Nos. 10-2009-0000660 (filed on Jan. 6, 2009), 10-2009-0000661 (filed on Jan. 6, 2009) and 10-2009-0049193 (filed on Jun. 3, 2009) which are hereby incorporated by reference in its entirety.

BACKGROUND

In more detail, the present disclosure relates to an apparatus for processing images and an operating method thereof, in which a plurality of turners are employed in order to extract a plurality of channel information from a signal received in one of the turners and then the channel information is displayed.

BRIEF DESCRIPTION OF THE DRAWINGS

The embodiments will be described in detail with reference to the following drawings in which like reference numerals refer to like elements wherein:

FIGS. 20 to 24 are views illustrating various examples of channel edit when an image channel list is displayed.

DETAILED DESCRIPTION

Figure 1:
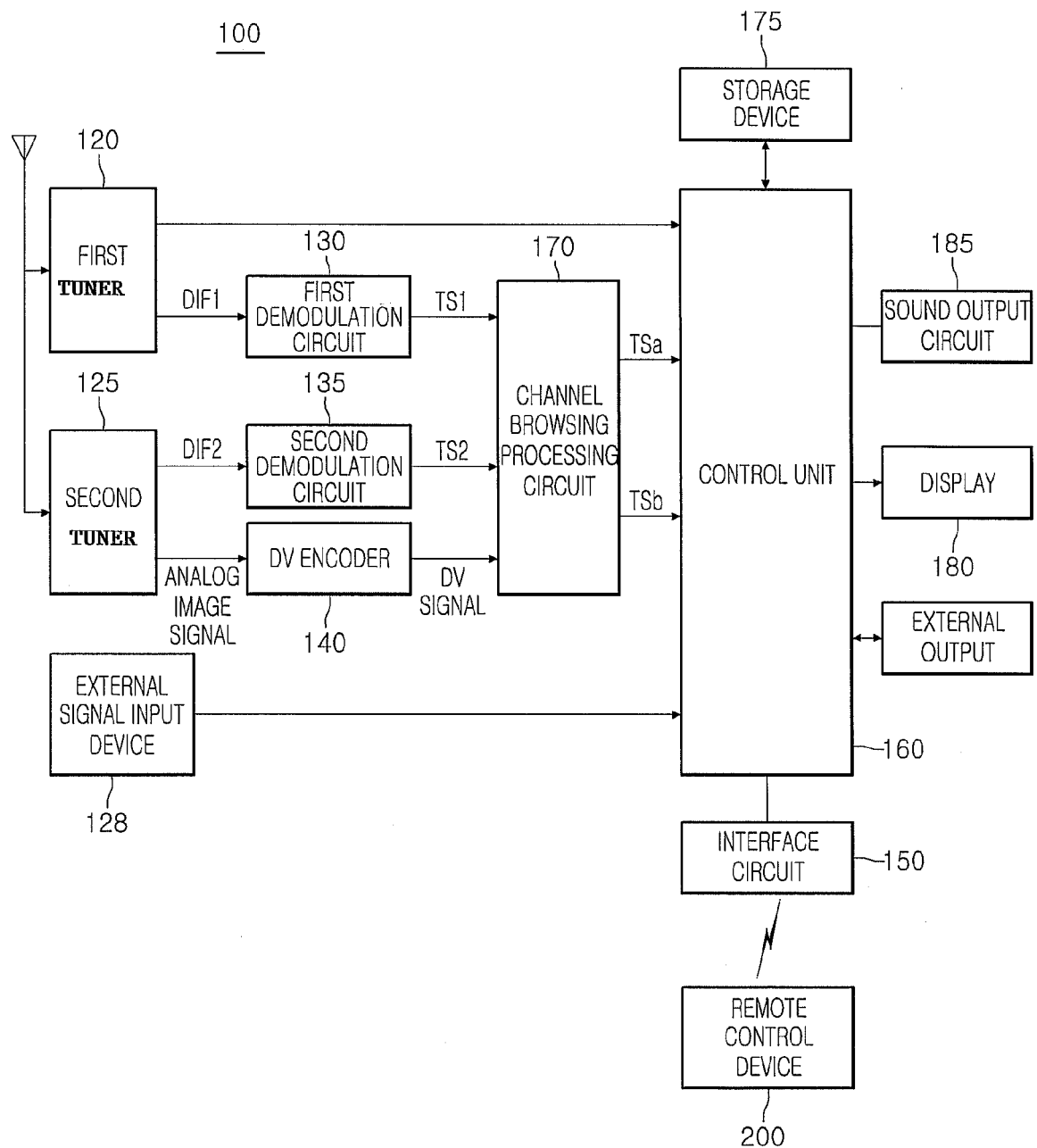
FIG. 1 is an internal block diagram of an apparatus for displaying images according to an embodiment.

FIG. 1 is an internal block diagram of an apparatus for displaying images according to a first embodiment. The apparatus for displaying images 100 includes a first tuner 120, a second tuner 125, an external signal input unit 128, a first demodulator 130, a second demodulator 135, an analog/digital converter 140, an interface unit 150, a controller 160, a channel browsing processing unit 170, a storage unit 175, a display 180, and a sound output unit 185.

The first tuner 120 selects a radio frequency (RF) broadcast signal corresponding to a channel selected by a user, among RF broadcast signals received through an antenna and then converts the selected RF broadcast signal into an intermediate frequency signal or a baseband image/sound signal. For example, if the selected RF broadcast signal is a digital broadcast signal, it is converted to an analog baseband image/sound signal (CVBS 1/SIF). That is, the first tuner 120 may be a hybrid tuner that can process a digital broadcast signal and an analog signal. The analog baseband image/sound signal (CVBS 1/SIF) outputted from the first tuner 120 can be inputted to the controller 160 directly.

Additionally, the first tuner 120 can receive an RF broadcast signal of a single carrier according to an Advanced Television Systems Committee (ATSC) format or an RF broadcast signal of a multi-carrier based on a Digital Video Broadcasting (DVB) format.

Similar to the first tuner 120, the second tuner 125 selects an RF broadcast signal corresponding to a channel selected by a user among RF broadcast signals received through an antenna, and then converts the selected RF broadcast signal into an intermediate frequency signal or a baseband image/sound signal.

In addition, the second tuner 125 sequentially/periodically selects an RF broadcast signal corresponding to all broadcasting channels that are pre-stored through a channel memory function among RF broadcast signals received through an antenna, and can convert the selected RF broadcast signal into an intermediate frequency signal or a baseband image/sound signal. In the embodiment, an image of another pre-stored channel is displayed on at least portion of a screen with a thumbnail view. Therefore, it is possible to sequentially or periodically receive an RF broadcast signal of all pre-stored channels.

For example, the first tuner 120 converts a main RF broadcast signal selected by a user into an intermediate frequency signal or a baseband image/sound signal. The second tuner 125 selects sequentially/periodically all RF broadcast signals (sub RF broadcast signal) except for the main RF broadcast signal or all RF broadcast signals, and can converts the selected signal into an intermediate frequency (IF) signal or a baseband image/sound signal. Although signal reception is shown as received through an antenna, the signals may be received via coaxial cable or fiber optic cables or any other type of connection for receiving broadcast signal from a broadcast station or content provider, such as cable service providers.

The first demodulator 130 receives the digital IF signal DIF1 converted in the first tuner 120 to perform a demodulation operation. For example, if the digital IF signal DIF1 outputted from the first tuner 120 is an ATSC format, the first demodulator 130 performs an 8-Vestigal Side Band (8-VSB) demodulation. Additionally, the first demodulator 130 may perform a channel demodulation. The first demodulator 130 may include a Trellis decoder, de-interleaves, and a Reed Solomon decoder to perform Trellis demodulation, de-interleaving, and Reed Solomon encoding.

For example, the digital IF signal DIF1 outputted from the first turner 120 is a DVB format, the first demodulator 130 performs a Code Orthogonal Frequency Division Modulation (COFDMA) demodulation. Additionally, the first demodulator 130 can perform channel demodulation. The first demodulator 130 may include a convolution decoder, a de-interleaver, and a Reed-Solomon decoder to perform convolution demodulation, de-interleaving, and Reed-Solomon demodulation.

The external signal input unit 128 performs a signal input with an external device. For this, the external signal input unit 128 includes an A/V input/output unit, and a wireless communication unit.

The external signal input unit 128 is connected to external devices such as Digital Versatile Disks (DVD), Blu-rays, game consoles, camcorders, computers (e.g., notebook computers), etc. to transmit an external input image signal, an external input sound signal, and an external input data signal into the controller 160 in the apparatus for displaying images 100. Additionally, an image signal, a sound signal, and a data signal, processed in the controller 160, can be outputted into another external device.

The A/V input/output unit of the external input circuit may include an Ethernet terminal, a USB terminal, a composite Video Banking Sync (CVBS) terminal, a component terminal, a S-video terminal (analog), a Digital Visual Interface (DVI) terminal, a High Definition Multimedia Interface (HDMI) terminal, a RGB terminal, a D-SUB terminal, an IEEE 1394 terminal, a SPDIF terminal, a Liquid HD terminal, etc., in order for inputs/outputs of video/audio signals of an external device.

Although not shown in the drawing, various input signals inputted through the external signal input unit 128 may be inputted into the channel browsing processing circuit 170 that will be described later such that thumbnail image extraction can be processed. For example, an analog signal inputted through the CVBS terminal and the S-video terminal, as mentioned above, is converted into a digital signal, and then is inputted into the channel browsing processing circuit 170. A digital signal inputted through other input terminals may be directly inputted into the channel browsing processing circuit 170 without analog/digital conversion. Here, the digital signal outputted from the external signal input circuit 128 may be a stream signal. For example, the digital signal may be MPEG-2 Transport Stream (TS) where an image signal of an MPEG-2 format and a sound signal of Dolby AC-3 format are multiplexed.

The wireless communication unit may perform a wireless internet connection. For example, Wireless LAN (WLAN) (Wi-Fi), Wireless broadband (Wibro), World Interoperability for Microwave Access (Wimax), High Speed Downlink Packet Access (HSDPA) can be used for the wireless internet connection.

Additionally, a wireless communication unit may perform a short-distance wireless communication with other electronic devices. For example, Bluetooth, Radio Frequency Identification (RFID), infrared Data Association (IrDA), Ultra Wideband (UWB), ZigBee, etc. can be used for the short-distance wireless communication.

In addition, the external signal input circuit 128 may be connected to various set-top boxes through at least one of the above-mentioned various terminals. For example, the set-top box is an Internet Protocol (IP) TV, image, sound, and data signals processed in a set-top box for IPTV may be transmitted into the controller 160, or signals processed in the controller 160 may be transmitted to a set-top box for IPTV may be processed in the controller 160 through the channel browsing processing circuit 170.

Moreover, the above-mentioned IPTV may include an arbitrary network TV for receiving a broadcast signal through a two-way network. Examples of the network TV are ADSL-TV, VDSL-TV, FTTH-TV, TV over DSL, Video over DSL, TV overIP (TVIP), Broadband TV (BBTV), internet TV, full browsing TV according to kinds of a transmission network.

The first demodulator 130 performs demodulation and channel decoding, and then outputs a stream signal TS1. The stream signal TS1 may be a signal in which an image signal, a sound signal, and a data signal are multiplexed. For example, the stream signal TS1 may be an MPEG-2 TS where an image signal of an MPEG-2 format and a sound signal of Dolby AC-3 format are multiplexed. In more detail, the MPEG-2 TS includes a header of 4 bytes and a payload of 184 bytes.

The stream signal TS1 is inputted into the controller 160 through the channel browsing processing circuit 170 and then demultiplexed and signal-processed. Before the stream signal TS1 is inputted into the controller 160, it is inputted into the channel browsing processing circuit 170 in order for channel browsing processing. The channel browsing processing will be described below.

The first demodulator 130 may include separate components based on an ATSC formant and a DVB format. The first demodulator 130 may include an ATSC demodulator and a DVB demodulator.

The second demodulator 135 performs a demodulation operation by receiving the digital IF signal DIF2 converted in the second turner 125, and then outputs a stream signal TS2. Operations of the second demodulator 135 may be the same as those of the first demodulator 130, and overlapping description may be omitted.

If a signal outputted from the second turner 125 is an analog baseband image signal (e.g., CVBS2), the signal may be converted into a digital signal in order to be processed in the channel browsing processing circuit 170.

The Digital Video encoder 140 converts an inputted analog signal into a digital signal. If the inputted signal is an image signal, sampling and quantization are performed to convert the image signal into a digital video DV signal. The converted digital video DV signal is inputted and processed in the channel browsing processing circuit 170.

The interface circuit 150 transmits an input signal from a user into the controller 160, or a signal from the controller 160 to the remote control device 200. For example, the interface unit 150 receives a user input signal (such as power on/off, channel selection, and screen configuration) from a remote control device 200, or transmits a signal from the controller 160 into the remote control device 200 according to various communication methods such as an RF communication method and an IR communication method.

The controller 160 demultiplexes an inputted stream, and then signal-processes the demultiplexed signals to generate and output a signal for an image and sound output. The controller 160 controls overall operations of the apparatus for displaying images 100. The controller 160 may include a demultiplexer, an image processing circuit, a sound processing circuit, and a user input signal processing circuit.

The controller 160 demultiplexes the inputted stream signal (e.g., MPEG-2 TS), and divides it into an image signal, a sound signal, and a data signal. Additionally, the controller 160 processes brightness, tint, and color adjustment of an image signal.

Additionally, the controller 160 may perform image processing of the demultiplexed image signal. For example, if the demultiplexed image signal is an encoded image signal, it is decoded. In more detail, if the demultiplexed image signal is an image signal of an MPEG-2 format, it is decoded using an MPEG-2 decoder. Additionally, if the demultiplexed image signal is an encoded image signal of an H.264 standard according to a Digital Multimedia Broadcasting (DMB) format or a DVB-H format, it is decoded using an H.264 decoder.

The image signal that is image-processed in the controller 160 is inputted into the display 180, and then displayed. Additionally, the processed image signal may be inputted to an external output terminal for connection to an external output device.

Additionally, the controller 160 may perform sound processing of a demultiplexed sound signal. For example, if the demultiplexed sound signal is an encoded sound signal, it can be decoded. If the demultiplexed sound signal is an encoded sound signal of an MPEG-2 format, it can be decoded using an MPEG-2 decoder. When the demultiplexed sound signal is an encoded sound signal of an MPEG-4 Bit Sliced Arithmetic coding (BSAC) standard according to a terrestrial Digital Multimedia Broadcasting (DMB) format, it can be decoded using an MPEG-4 decoder. If the demultiplexed sound signal is an encoded sound signal of an Advanced Audio Codec (AAC) of an MPEG-2 formant according to a satellite DMB or DVB-H, it can be decoded by an AAC decoder. The controller 160 may adjust base, treble, and volume.

The sound signal processed in the controller 160 is inputted to the sound output circuit 185 (e.g., a speaker) to output a sound. Additionally, the sound signal can be inputted to external output terminal for connection to the external output device.

Additionally, the controller 160 may perform data processing of a demultiplexed data signal. For example, if the demultiplexed data signal is an encoded data signal, it can be decoded. The encoded data signal may be Electronic Program Guide (EPG) information including broadcasting information such as a start time and end time of a broadcasting program broadcasted in each channel. For example, the EPG information may be TSC-PSIP (ATSC-Program and System Information Protocol) if it is in an ATSC formant. In a DVB mode, the EPG information may include DVB-Service Information (DVB-SI). ATSC-PSIP information or DVB-SI information may be information included in the above stream (i.e., a header (4 byte) of MPEG-2 TS).

Moreover, the controller 160 may perform On Screen Display (OSD) processing. The controller 160 can generate signals for displaying diverse information on a screen of the display 180 through graphics or texts, based on at least one of an image-processed image signal, a data-processed data signal, and a user input signal from the remote control device 200. The generated signal may be inputted into the display 180 together with the image-processed image signal and data-processed data signal.

The above-mentioned generated signal for displaying graphics or texts may include various data such as a user interface screen, various menu screen, widgets, and icons of the apparatus for displaying images 100.

The channel browsing processing circuit 170 may perform browsing processing with respect to at least one of a broadcast signal that corresponds to a received channel and various input image signals inputted through the external signal input circuit 128. The stream signal (TS1 or TS2) is demultiplexed by receiving a demodulation and channel demodulated stream signal TS1 or TS2 from the demodulator 130 or 135, receiving a stream signal from the external input signal input circuit 128, or receiving a digital video DV signal converted in the DV encoder 140. A portion of the demultiplexed image signals is extracted and is multiplexed based on an image signal including an extracted signal, such that a new stream signal Tsa can be outputted. For example, the stream signal TSa or TSb may be a signal having the same format as MPEG2 TS.

The channel browsing processing circuit 170 may output a main stream signal TSb as it is without additional processing. The main stream signal TSb corresponds to a main image signal displayed in a main area among image signals displayed on the display 180. The channel browsing processing circuit 170 outputs a sub stream signal TSa with the above-mentioned channel browsing processing. The sub stream signal TSa corresponds to a sub image signal displayed in a sub area among image signals displayed on the display 180. In relation to this specification, the main stream signal refers to a broadcast signal or stream that is continuously displayed on the most area of the display 180 over a predetermined time regardless of the channel browsing. The sub stream signal refers to a signal from which thumbnails for channel browsing can be displayed.

According to an embodiment, a partial image about broadcast signals of channels is extracted using the channel browsing processing circuit 170, and then is re-encoded into a transport stream format to be transmitted into the controller 160. Additionally, when a channel list is displayed on the display 180, at least one of the re-encoded signals is displayed on the screen with a thumbnail view. Accordingly, a user can intuitively recognize broadcasting contents of another channel.

The channel browsing processing circuit 170 extracts a partial image of various input images inputted through the external signal input circuit 128, and then re-encodes it in a stream format. Therefore, when a list of external input signals is displayed on the display 180, at least a partial image about external input images inputted from external input devices can be displayed on the screen with a thumbnail view. Accordingly, a user can intuitively recognize contents inputted from external input devices. Various embodiments for the channel browsing processing circuit 170 will be described with reference to FIGS. 2, 3, 5, and 6.

The storage device 175 can store a program for each signal processing and controlling of the controller 160, a signal processed image signal, a sound signal, and a data signal The storage device 175 may perform a function for temporarily storing an image, sound, or data signal inputted from the external signal input unit 128.

The storage device 175 can store a corresponding broadcasting channel through a channel memory function. The storage device 175 may include at least one type of storage media among a flash memory type, a hard disk type, a multimedia card micro type, a card type memory (e.g., SD or XD memory, etc.), RAM, ROM (e.g., EEPROM), etc.

Although the storage device 175 is shown as separated from the controller 160 in the drawing, it is not limited thereto, that is, the storage unit 175 may be built in the controller 160. The apparatus for displaying images plays versatile files (e.g., a video file, a picture file, a music file, a text file, etc.) stored in the storage device 175 may be displayed to a user.

The display 180 converts an image signal, a data signal, an OSD signal, which are processed in the controller 160, or an image signal and a data signal, which are received from the external signal input circuit 128, into an R, G, B signal in order to generate appropriate drive signals. The display 180 may be realized with various forms such as Plasma Display Panels (PDPs), Liquid Crystal Displays (LCDs), Organic Light Emitting Diodes (OLEDs), flexible displays, 3D-displays, etc. Additionally, the display unit 180 may be configured with a touch screen so as to be used as an input device in addition to an output device.

The sound output circuit 185 receives a sound processed signal (e.g., a stereo signal, a 3.1 channel signal, or a 5.1 channel signal) from the controller 160, and then output it as a sound. The sound output circuit 185 may be realized with various kinds of a speaker.

The remote control device 200 transmits a user input to the interface circuit 150. For this, the remote control device 200 may utilize Bluetooth, Radio Frequency (RF) communication, Infrared (IR), Ultra Wideband (UWB), ZigBee, etc. The remote control device 200 may receive an image signal, an audio signal, and a data signal from the interface circuit 150, and then outputs them on the remote control device. The remote control device 200 may be a motion sensitive remote. The motion sensitive remote will be described later with reference to FIG. 7.

Furthermore, two tuners are shown in the drawing and a thumbnail image is displayed on a screen when a channel list is shown, but this is not limited thereto. It is possible to realize an embodiment using one tuner.

For example, through one turner, while receiving a broadcast signal of a selected channel, if there is a channel list view instruction, it is possible to sequentially and periodically receive corresponding broadcast signals of all broadcasting channels stored through the channel memory function. Accordingly, the channel list view may be performed.

The apparatus for displaying images, as being fixed, may be a digital broadcasting receiver capable of receiving at least one of digital broadcasting of ATSC (8-VSB), digital broadcasting of a DVB-T (COFDM), and digital broadcasting of ISDB-T (BST-OFDM). Alternatively, the apparatus for displaying images, as being mobile, may be a digital broadcasting receiver capable of receiving at least one of digital broadcasting of a terrestrial DMB, digital broadcasting of a satellite DMB, digital broadcasting of ATSC-M/H, digital broadcasting of DVB-H (COFDM), and digital broadcasting of a Media Forward Link Only format. Alternatively, the apparatus for displaying images may be a digital broadcasting receiver for a cable, satellite communication, and IPTV.

In addition, the apparatus for displaying images described in this specification may include TVs, mobile phones, smart phones, notebook computers, digital broadcasting terminals, Personal Digital Assistants (PDAs), and Portable Multimedia Players (PMPs).

Figure 2:
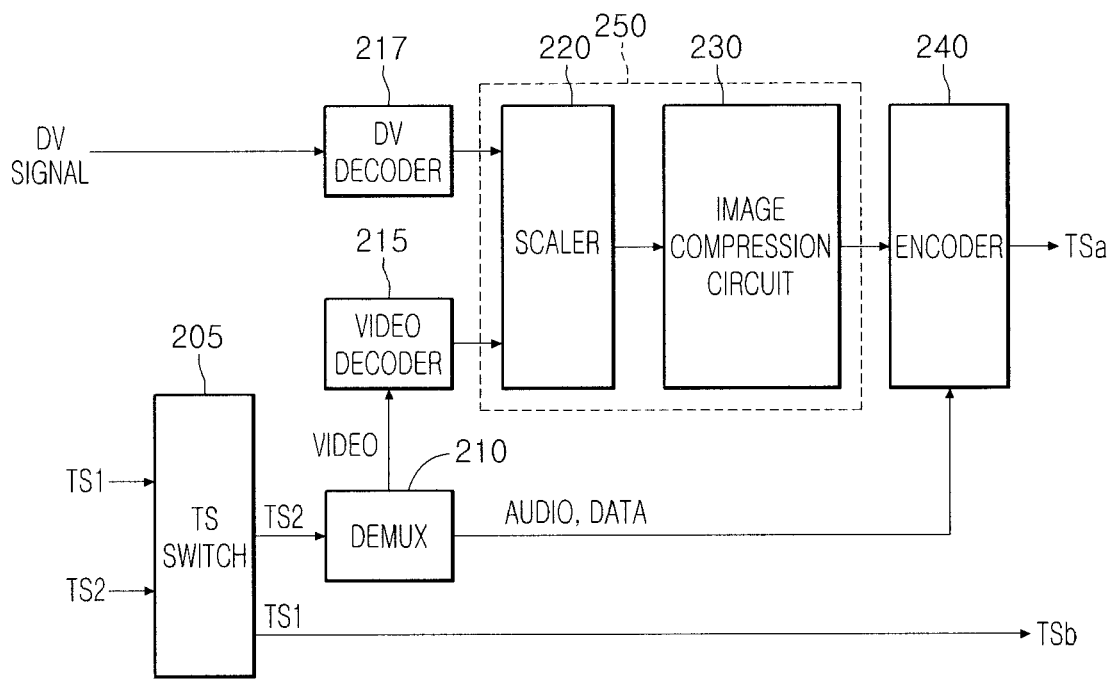
FIG. 2 is a block diagram illustrating one embodiment 170-1 of the channel browsing processing circuit 170 of FIG. 1.

FIG. 2 is a block diagram illustrating one embodiment 170-1 of the channel browsing processing circuit 170 of FIG. 1. The channel browsing processing circuit 170-1 includes a switch 205, a demultiplexer 210, a video decoder 215, a DV decoder 217, a thumbnail generator 250, and an encoder 240. Additionally, the thumbnail generator 250 includes a scaler 220, and an image compression circuit 230.

The switch 205 selects one of inputted streams TS1 and TS2 and outputs it as a main stream TSb of a TS format without additional conversion operation, and transmits the remaining one to the demultiplexer 210 to output it as a sub stream TSa of a TS format. According to one embodiment, by switching the switch 205, TS2 may be selected as a main stream, and TS1 may be selected as a sub stream. In other words, one of streams inputted into the switch 205 may be selected as a main stream and the other is selected as a sub stream. According to an alternative embodiment, the switch 205 can be omitted. If the switch 205 is omitted, the main stream and sub stream are predetermined and fixed among the plurality of streams.

The main stream TS1 corresponds to the main image signal and a primary broadcast signal. The main image signal may be displayed on the most area of the display 180. The sub stream TS2 delivered to the demultiplexer 210 corresponds to a sub image signal except for a main channel, and thus a thumbnail extracted from the sub stream can be displayed on a partial area of the display 180.

This method may be accomplished when simple view function of "an image channel list" that displays a channel list in a partial area not an entire area of the display 180. A thumbnail is extracted from the sub stream inputted into the demultiplexer 210 and then is outputted to the screen. In addition, the simple view function may be performed when an external input list except for a channel list is displayed on the display 180. Additionally, the simple view function may be performed when a channel list and an external input list are displayed on the display 180 simultaneously.

The demultiplexer 210 demultiplexes a received stream signal TS1 or TS2, and may divide the received signal into an image signal, a sound signal, and/or a data signal. The image signal among the divided signals is transmitted into the video decoder 215 and the remaining signals (i.e., the sound signal and/or the data signal) are provided to the encoder 240.

The video decoder 215 extracts a picture from an inputted video signal and decodes it. The extracted picture may be a picture of a video signal or several pictures corresponding to a partial interval of a video signal. The decoding of the picture can be performed using an MPEG-2, MPEG-4, or H.264 decoder. The DV decoder 217 receives a digital signal DV and extracts a picture or several pictures of a partial interval. For example, the decoder 215 or decoder 217 signals at its input and outputs P-frame, I-frame and B-frame. To provide a still picture thumbnail, the thumbnail generator uses the I-frame, and to provide a moving picture thumbnail, the thumbnail generator uses the P, I and B frames.

The thumbnail generator 250 generates a thumbnail by scaling and compressing pictures inputted from the video decoder 215 or the DV decoder 217.

The scaler 220 of the thumbnail generator 250 scales an image signal (I, P and/or B frames) inputted from the video decoder 215 or the DV decoder 217. For example, the size or the resolution of the inputted image signal can be changed. This size change is performed to display a thumbnail with an appropriate size when it is displayed on the display 180 with a thumbnail view.

In addition, the scaler 220 can convert pictures with different sizes, which are inputted based on a simple view or a total view of an image channel list. For example, the size of an image displayed in a thumbnail view during a total view of an image channel list can be larger than that of a simple view of an image channel list. The above mentioned simple view and total view functions can be performed when an external input list besides a channel list is displayed on the display 180. Additionally, it can be performed also when the channel list and the external input list are displayed on the display 180.

The image compression circuit 230 may encode and/or compress an image signal that is converted in the scaler 220. For example, the image compression 230 encodes the image whose size is converted in the scaler 220, into JPEG or MPEG. A still picture or a moving picture encoded in the image compression unit 230 is displayed on the display 180 with a thumbnail view, later where a still picture thumbnail and/or a moving picture thumbnail is displayed.

The encoder 240 may further encode and multiplex the image (encoded in the image compressor 230) and the audio and data signals from the demultiplexer 210, into a transport stream format. The format of the transport stream may be the same as that of the transport streams TS1 and TS2 inputted in the channel browsing processing unit 170-1, or may be an MPEG2 TS format.

According to an embodiment, the channel browsing processing circuit 170-1 extracts and re-encodes at least a partial image among broadcast signal images of a plurality of channels and external input images, such that at least a portion of channel broadcast signal images and external input images from external input devices can be displayed on a screen with a thumbnail view during a channel list view or an external input list view. Accordingly, a user may intuitively recognize contents broadcasted on other channels or contents inputted from various external input devices.

The channel browsing processing circuit 170-1 of FIG. 2 outputs two output streams TSa and TSb. If a chip constituting the controller 160 of FIG. 1 receives only one input, System Packet Interface (SPI) may be used. The channel browsing circuit 170-1 may be integrated in a single chip.

Figure 3:
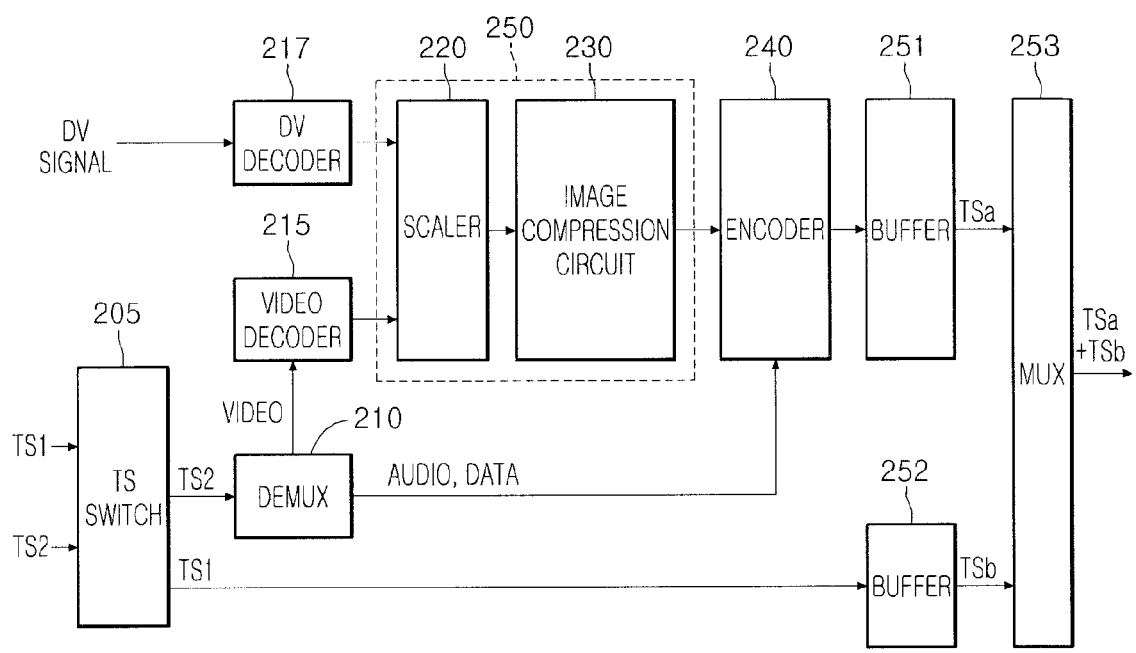
FIG. 3 is a block diagram illustrating a configuration of a channel browsing processing circuit 170-2 according to another embodiment.

FIG. 3 is a block diagram illustrating a configuration of a channel browsing processing circuit 170-2 according to another embodiment. The configuration and operations of the channel browsing processing circuit 170-2 of FIG. 3 are substantially the same as those of the channel browsing processing circuit 170-1 of FIG. 2.

The channel browsing processing circuit 170-2 additionally includes buffers 251 and 252 and a multiplexer 253. The video signal compressed by the encoder 240 is buffered in the buffer 251. The main stream TSb outputted from the switch 205 is buffered in the buffer 252.

The sub stream TSb and main-stream TSa, which are buffered in the respective buffers 251 and 252, are multiplexed by the multiplexer 253, and then outputted as one stream TSa+TSb. This embodiment can be applied to a chip model in which the controller 160 of FIG. 1 receives one input. The switch 205 can be omitted in the embodiment of FIG. 3. The channel browsing processing circuit 170-2 may be configured with one integrated circuit chip.

Figure 4:
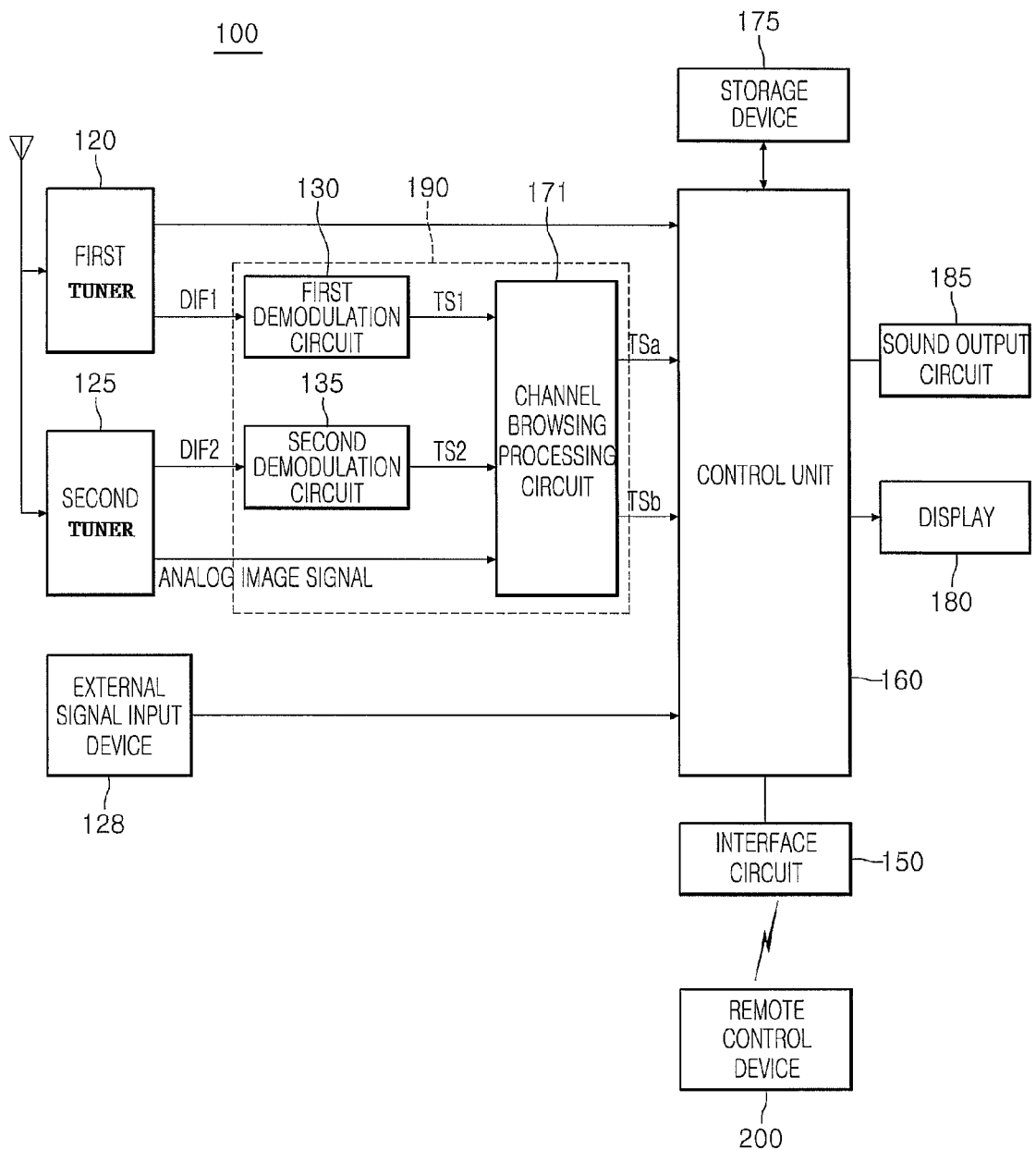
FIG. 4 is an internal block diagram of an apparatus for displaying images 100 according to another embodiment.

FIG. 4 is an internal block diagram of an apparatus for displaying images 100 according to another embodiment. Unlike the embodiment of FIG. 1, an analog signal received by a second tuner 125 is directly inputted into a channel browsing processing circuit 171. Description about other components of the apparatus for displaying images 100 of FIG. 4 is the same as that of FIG. 1. The channel browsing processing circuit 171 receives an analog image signal from the second tuner 125 and outputs it as a transport stream TSa. A first demodulator 130, a second demodulator 135, and a channel browsing processing circuit 171 of FIG. 4 may be configured as one integrated chip.

Figure 5:
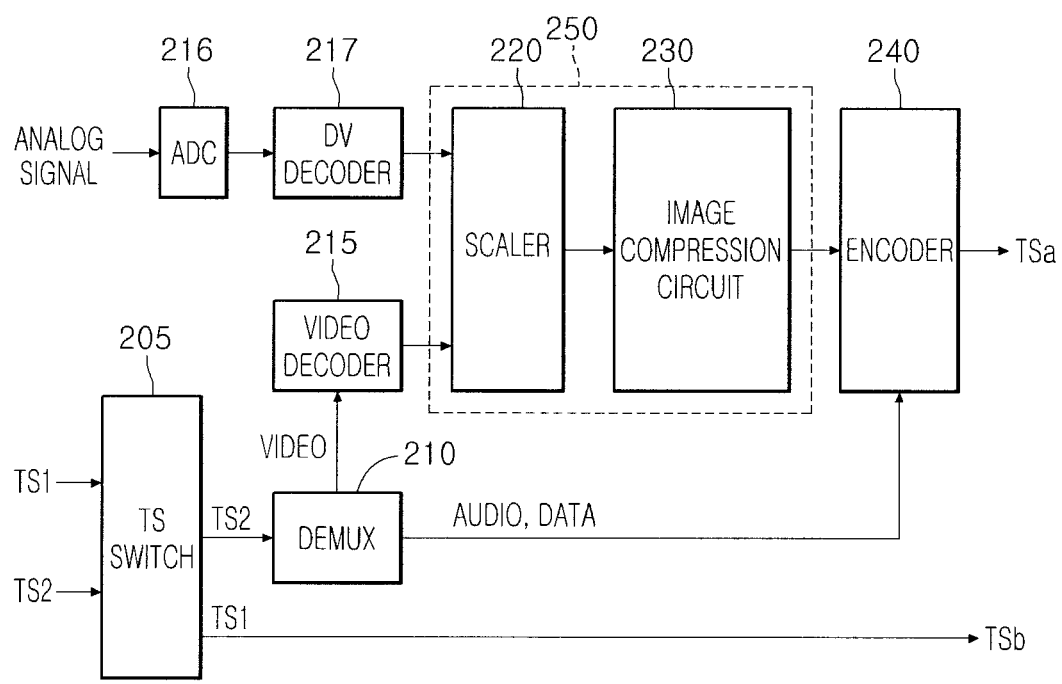
FIG. 5 is a view illustrating one embodiment 171-1 of the channel browsing processing circuit 171 of FIG. 4.

FIG. 5 is a view illustrating one embodiment 171-1 of the channel browsing processing unit 171 of FIG. 4. An analog signal received from the second tuner 125 of FIG. 4 is converted into a digital signal by an A/D (analog to digital) converter 216, and is decoded by an NTSC/PAL decoder 217. A portion of the decoded picture is extracted. According to an embodiment, the A/D converter 216 and the NTSC/PAL decoder 217 can be integrated into one in order to constitute one analog decoder. The A/D converter 216 can be separately configured, and can be included in the NTSC/PAL decoder 217. The A/D converter 216 and the NTSC/PAL decoder 217 receive an analog signal and convert it into a digital signal, and then decode it. A portion of the decoded picture is extracted and then is outputted into the thumbnail generator 250.

The transport streams TS1 and TS2 inputted into the switch 205 are processed like the embodiment of FIG. 2 or 3. One of Ts1 and Ts2 is directly outputted into the controller 160 as a main stream TSb and the other is outputted to extract a thumbnail in the thumbnail generator 250, and then is outputted to the controller as a sub stream TSa for providing channel information.

Figure 6:
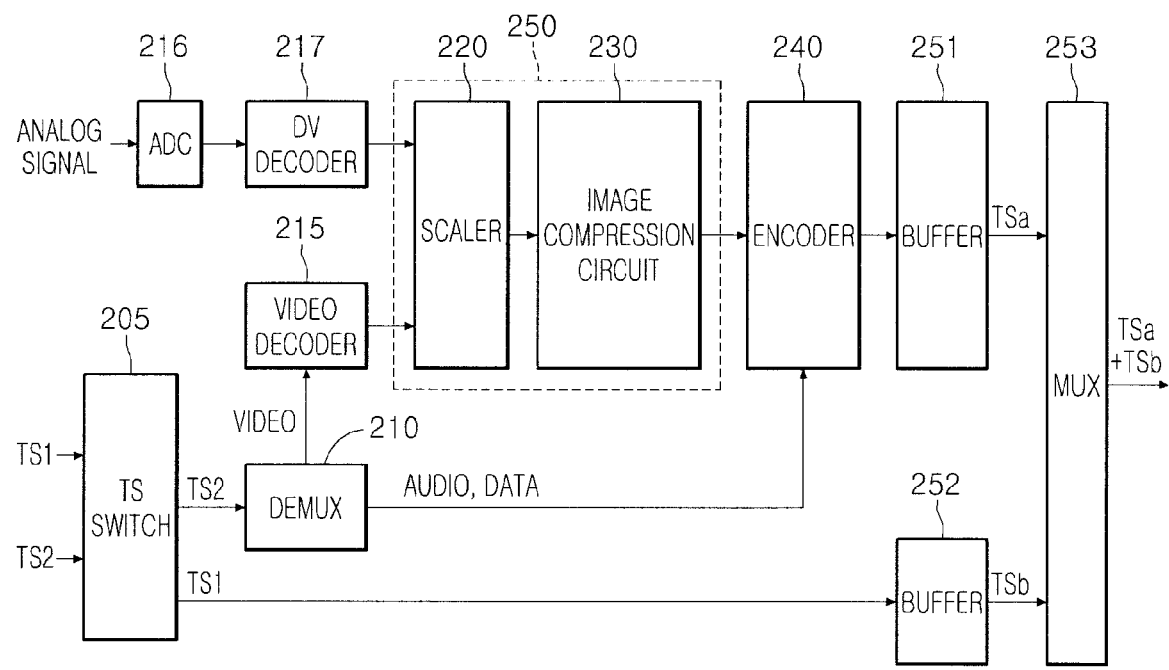
FIG. 6 is a view illustrating another embodiment 171-2 of the channel browsing processing circuit 171 of FIG. 4.

FIG. 6 is a view illustrating another embodiment 171-2 of the channel browsing processing circuit 171 of FIG. 4. The channel browsing processing circuit 171-2 of FIG. 6 has the same components as the channel browsing processing unit 170-2 of FIG. 3, but additionally includes an A/D converter 216 and an NTSC/PAL decoder 217 or an analog decoder for receiving and processing an analog signal. Descriptions for the A/D converter 216 and the NTSC/PAL decoder 217 are the same as those of FIG. 5. The switch 205 can be omitted in FIG. 5 or 6. By the embodiment shown in FIG. 5 or 6, a thumbnail is extracted for a video signal inputted as an analog signal, in order to provide channel information.

Figure 7:
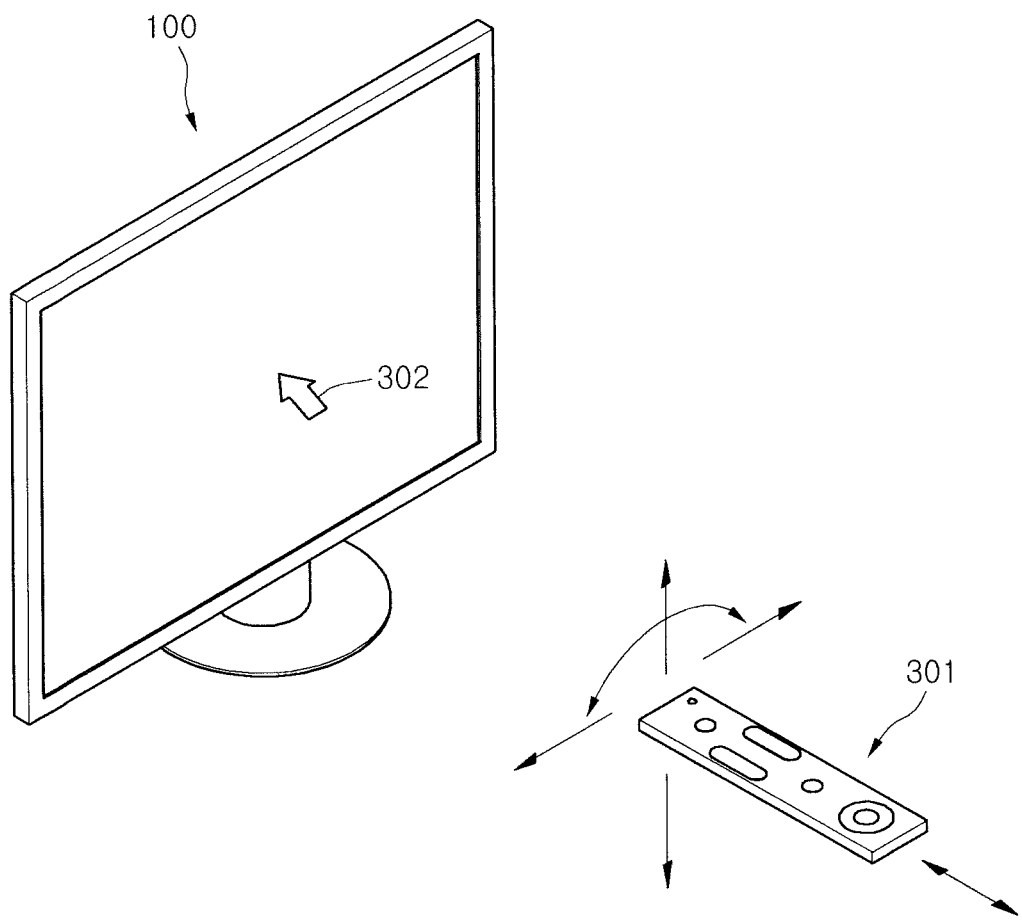
FIGS. 7 and 8 are views illustrating a usage example of the remote control device 200 of FIG. 1 or 3.
Figure 8:
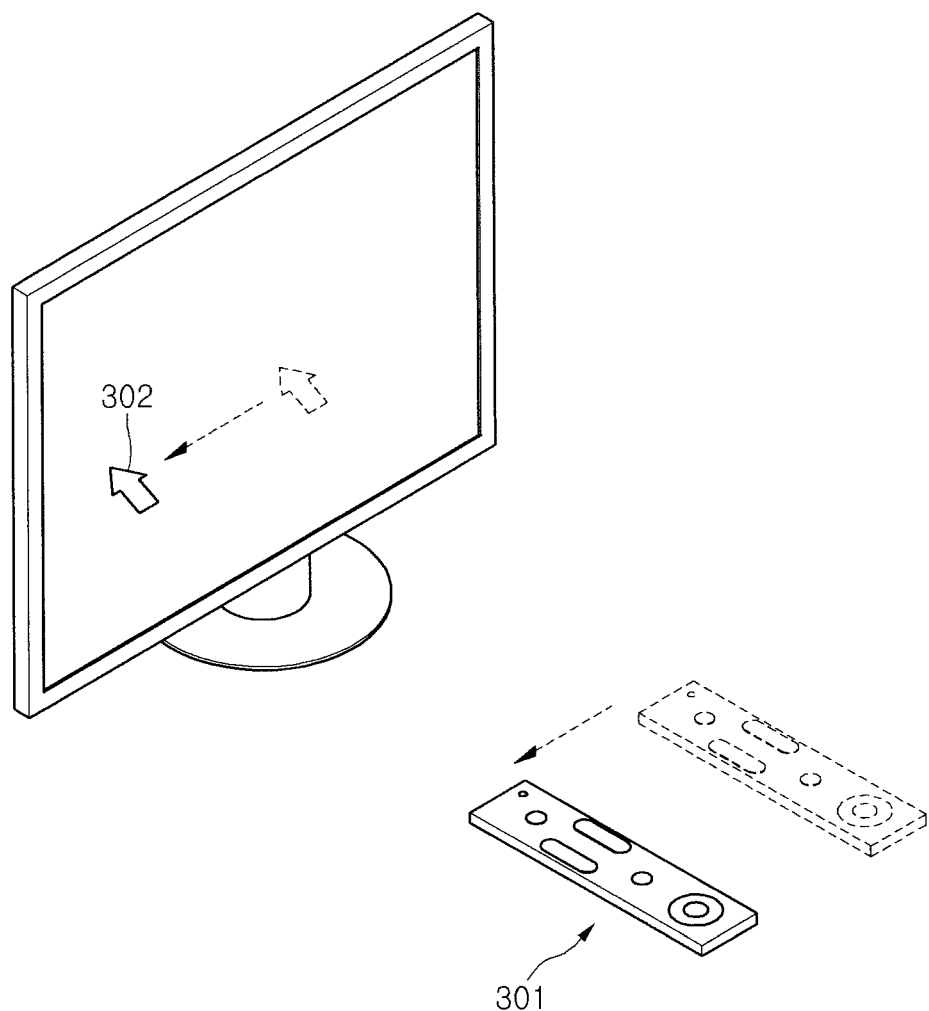

In order to control the apparatus for displaying images, a movement sensing remote with a built-in movement sensor can be used as the remote control device 200. FIGS. 7 and 8 are views illustrating a usage example of the remote control device 200 of FIG. 1 or 3. The movement sensing remote 301 receives and transmits a signal from and into the apparatus for displaying images 100 according to an RF communication standard. As shown in FIG. 7, a pointer or cursor 302 corresponding to the movement sensing remote 301 can be displayed on the apparatus for displaying images 100.

The user moves the remote 301 up/down, left/right, back/forth, or rotating. The pointer 302 displayed in the apparatus for displaying images 100 corresponds to a movement of the remote 301. FIG. 8 is a view illustrating a movement of a pointer on the display corresponding to a movement of the remote 301.

As shown in FIG. 7, when a user moves the remote 301 to the left, the pointer 302 displayed on the apparatus 100 moves to the left according to the movement of the remote 301 by a user. This embodiment includes a sensor that can sense the movement of the remote 301. Information about the movement of the remote 301 sensed through the sensor is transmitted into the apparatus for displaying images 100. The apparatus for displaying images 100 determines an operation of the remote 301 using information about the movement, and calculates coordinates of the pointer 302 corresponding to the determination.

FIGS. 7 and 8 illustrate an example that the pointer 302 on the display 180 moves in response to up, down, left, right or rotation of the remote 301. A movement speed or a movement direction of the pointer 302 may correspond to a moving speed or a moving direction of the remote 301.

In this embodiment, the pointer 302 on the apparatus for displaying images 100 is configured to move in response to a movement of the remote 301. In another embodiment, in response to a movement of the remote 301, a predetermined instruction or command may be set to be inputted into the apparatus 100 to execute a prescribed operation. When the remote 301 moves back and forth, the size of an image on the apparatus for displaying images 100 can be enlarged or reduced.

Figure 9:
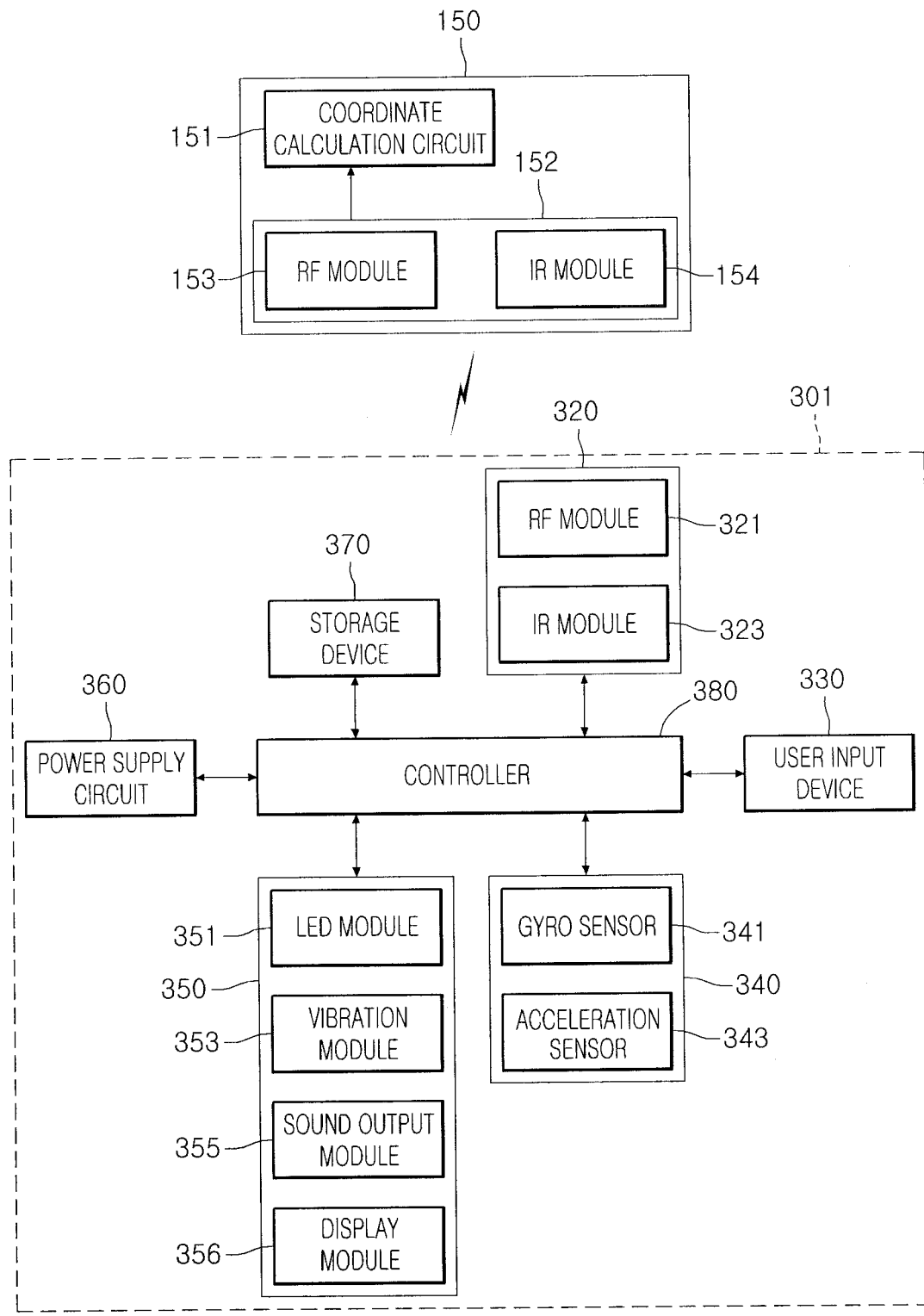
FIG. 9 is an internal block diagram illustrating the interface unit 150 of FIG. 1 and the movement sensitive remote 301 of FIGS. 7 and 8.

FIG. 9 is an internal block diagram illustrating the interface unit 150 of FIG. 1 and the movement sensing remote 301 of FIGS. 7 and 8. The remote 301 may include a wireless communication circuit 320, a user input circuit 330, a sensing circuit 340, and output circuit 350, a power supply circuit 360, a memory 370, and a controller 380.

The wireless communication circuit 320 receives and transmits a signal from and into the apparatus 100. In this embodiment, the remote 301 includes an RF module 321 that receives and transmits a signal from and into the interface unit 310 of the apparatus 100 according to an RF communication standard. Additionally, the remote 301 includes an IR module 323 that receives and transmits a signal from and into the interface unit 310 of the apparatus 100 according to an IR communication standard.

In this embodiment, the remote 301 transmits a signal including information about an operation or a movement of the remote 301 through the RF module 321. Additionally, the remote 301 receives the signal transmitted by the apparatus 100 through the RF module 321. The motion detective remote 301 may transmit instructions such as power on/off command, change channel, change volume command into the apparatus 100 through the IF module 323.

The user input device 330 may be configured with a keypad or a button. A user may input instructions related to the apparatus 100 operation into the remote 301 via the user input device. If the user input device 330 includes a hard key button, a user inputs instructions through a push operation of the hard key button. If the user input unit 330 includes a touch screen, a user touches a soft key to input instructions. Moreover, the user input device 330 may further include various kinds of input types that a user can operate, such as a scroll key or a jog key.

The sensing circuit 340 may include a gyro sensor 341 and/or an acceleration sensor 343. The gyro sensor 341 senses information related to operations of the remote 301. For example, the gyro sensor 341 senses information related to operations of the motion detective remote 301 based on x, y, and z axes or coordinates. The acceleration sensor 341 senses information about a movement speed or acceleration of the remote 301. The output circuit 350 outputs an image or sound signal corresponding to an operation of the user input device 330 or a signal transmitted from the apparatus 100. Through the output circuit 350, a user determines whether there is an operation of the user input device 330 or not, or whether there is a control of the apparatus 100 or not.

For example, the output circuit 350 includes an LED module, a vibration module 353, a sound output module 355, and/or a display module 357. The LED module 351 lights on and off when the user input device 330 is operated or a signal is received from or transmitted into the apparatus 100 through the wireless communication circuit 320. The vibration module 353 generates a vibration. The sound output module 355 outputs a sound. The display module 357 outputs an image.

The power supply circuit 360 supplies a power to the remote 301. The power supply circuit 360 can save a power by cutting off a power supply when the remote 301 does not move for a predetermined time. The power supply circuit 360 begins to supply a power when a predetermined key of the remote 301 is pressed or motion is detected.

The memory 370 can store various kinds of application data necessary for a control or an operation of the remote 301. If the remote 301 transmits and receives a signal wirelessly through the apparatus 100 and the RF module 321, the remote 301 and the image display apparatus 100 transmit and receive a signal through a predetermined frequency band. The controller 380 of the remote 301 stores information in the memory 370. The information is related to a frequency band through which the controller 380 transmits and receives a signal wirelessly into and from the apparatus 100 paired with the remote 301.

The controller 380 controls overall operations related to a control of the motion detective remote 301. The controller 380 transmits a signal corresponding to a predetermined key operation of the user input device 330 or a signal corresponding to an operation of the remote 301 sensed in the sensing circuit 340, into the interface circuit 310 of the apparatus 100 through the wireless communication circuit 320.

The interface circuit 150 of the apparatus 100 includes a wireless communication circuit 152 and a coordinate calculation circuit 151. The wireless communication circuit 152 wirelessly transmits and receives a signal into and from the remote 301. The coordinate calculation circuit 151 calculates a coordinates of a pointer corresponding to an operation of the remote 301.

The wireless communication circuit 152 wirelessly transmits and receives a signal into and from the remote 301 through the RF module 153 or the IR module 154. The coordinate calculation circuit 151 calculates a coordinates x and y of the pointer 302 that will be displayed on the display 180 and corrects a shaking or an error from a signal corresponding to an operation of the remote 301 received through the wireless communication circuit 152.

A transport signal of the remote 301 received into the apparatus 100 through the interface circuit 150 is outputted into the controller 160 of the apparatus 100. The controller 160 determines information about an operation or a movement and key manipulation of the motion detective remote 301 using a signal transmitted from the motion detective remote 301, and controls the apparatus 100 in accordance thereto.

The block diagram of the remote 301 in the image display apparatus 100 and the remote control device 200 of FIGS. 1 and 4 are exemplary embodiment and various modifications may be realized by one of ordinary skill in the art. Each component of the block diagram can be integrated, added or omitted in accordance with specification of the apparatus 100 and the remote 301. That is, if necessary, more than two components can be integrated into one, or one component is configured with more than two components. Additionally, functions performed in each block diagram illustrate embodiments but its specific operations or components do not intend to limit the scope of the present disclosure.

Figure 10:
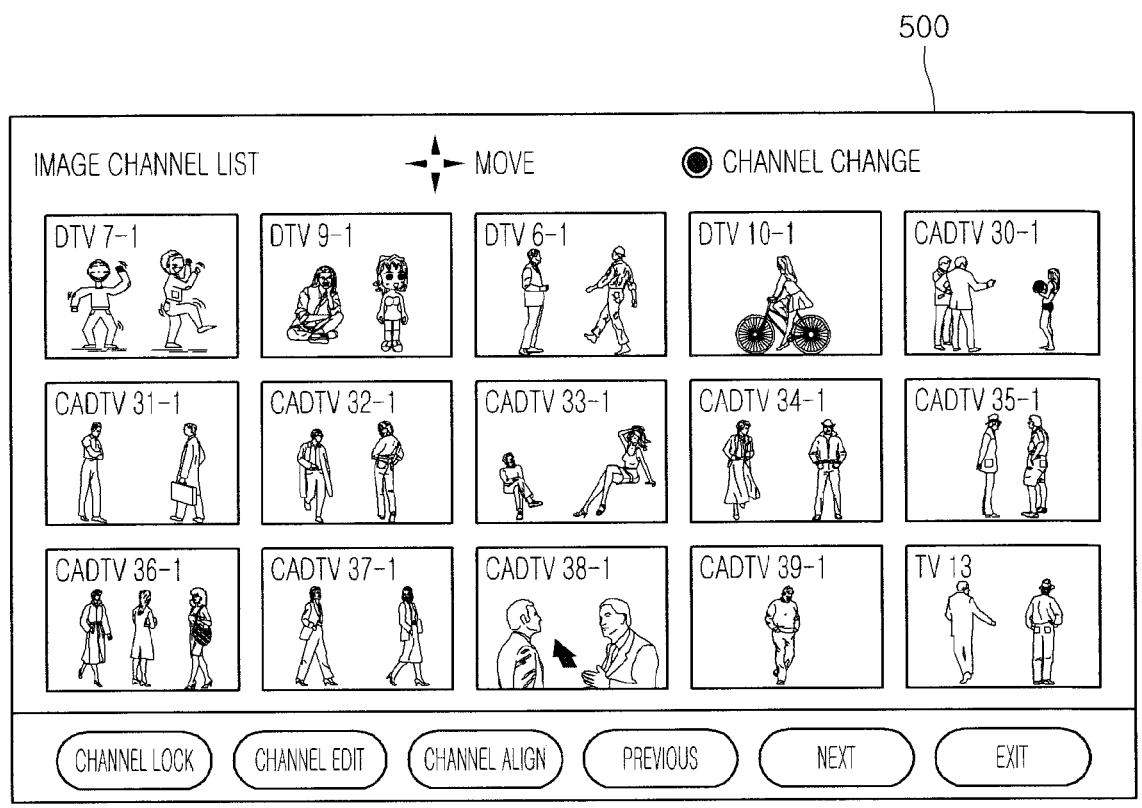
FIG. 10 is a view illustrating a screen according to operations of the channel browsing processing circuit 170-1, 170-2, 171-1, or 171-2 of FIG. 2, 3, 5, or 6.

FIG. 10 is a view illustrating a screen according to operations of the channel browsing processing circuit 170-1, 170-2, 171-1, or 171-2 of FIG. 2, 3, 5, or 6. When an instruction of a channel list view is inputted from a user either via remote 301 or a button on the apparatus 100, a thumbnail image screen 500 including thumbnail images corresponding to a broadcast signal image of received channels, as shown in FIG. 10, is displayed on the display 180. At this point, an "image channel list" can be displayed on an upper portion of the display 180. As shown in the drawing, a total view function is performed to display a thumbnail image over an entire area of the display 180. Since the thumbnail image screen 500 including a plurality of thumbnail images is displayed on the display 180, a user may intuitively recognize broadcasting contents in other channels.

In addition, the thumbnail image screen 500 on the display 180 may further include an edit menu based on the displayed thumbnail image. The edit menu, as shown in the drawing, may include a "channel lock" item, a "channel edit" item, a "channel align" item, a "previous" item, a "next" item, and an "exit" item. The "channel lock" item is for a lock function that prevents the editing of the selected thumbnail image. The "channel edit" item is for editing the selected thumbnail image. The "channel align" item is for aligning and displaying thumbnail images. The "previous" item is for displaying a previous thumbnail image. The "next" item is for displaying the next thumbnail image. The "exit" item is used for exiting to another memory item from the image channel list.

In addition, the displayed thumbnail image may be a picture (still picture) or a video (moving picture). Additionally, the displayed thumbnail image may be a currently inputted image, or a previously stored image. The thumbnail images displayed in the thumbnail image screen 500 may be images processed and extracted in the channel browsing processing circuit 170.

If one thumbnail image is selected, a broadcast signal image of a channel corresponding to the selected thumbnail image can be displayed on the display 180. If one thumbnail image is focused, the focused thumbnail image can be focused by a cursor indication, a pointer indication, a highlight indication, or an enlargement indication, etc., and when one thumbnail image is focused, corresponding program information can be displayed. If there is an edit instruction, a broadcast signal image corresponding to the selected thumbnail image can be edited through favorite register, delete register, lock register, etc.

The thumbnail image screen 500 may display on the display 180 a previously deleted or non-registered thumbnail image. The deleted or non-registered thumbnail image can be distinguished from an active thumbnail image by differentiating at least one of its brightness, contrast, fade, and transparency. Thumbnail images displayed in the thumbnail image screen 500 may be displayed and aligned according to any one of a channel number, a preset favorite channel, a recently watched channel, and previously deleted channel. If there is an instruction for an another screen view or a previous screen view, the next screen or the previous screen can be displayed through drag, scroll, or rotation or the remote 301.

If there is a movement input of a cursor or a pointer, the cursor or the pointer is moved on the thumbnail image screen according to a movement direction of up, down, left, or right.

Moreover, although the thumbnail image is displayed over an entire area of the display 180 in the embodiment, the embodiment is not intended to limit the present disclosure. For example, it may be possible to display a thumbnail screen including a thumbnail image on a predetermined portion/area of the display 180 while another predetermined portion/area of the screen displays other information or a selected channel.

At least a portion of the thumbnail images of the screen 500 may be updated to correspond to the received broadcast signal images. It is possible to update the thumbnail image periodically or randomly. A portion or all of the thumbnail image can be updated. The updated thumbnail image is based on an image that is updated in the channel browsing processing circuit 170.

Figure 11:
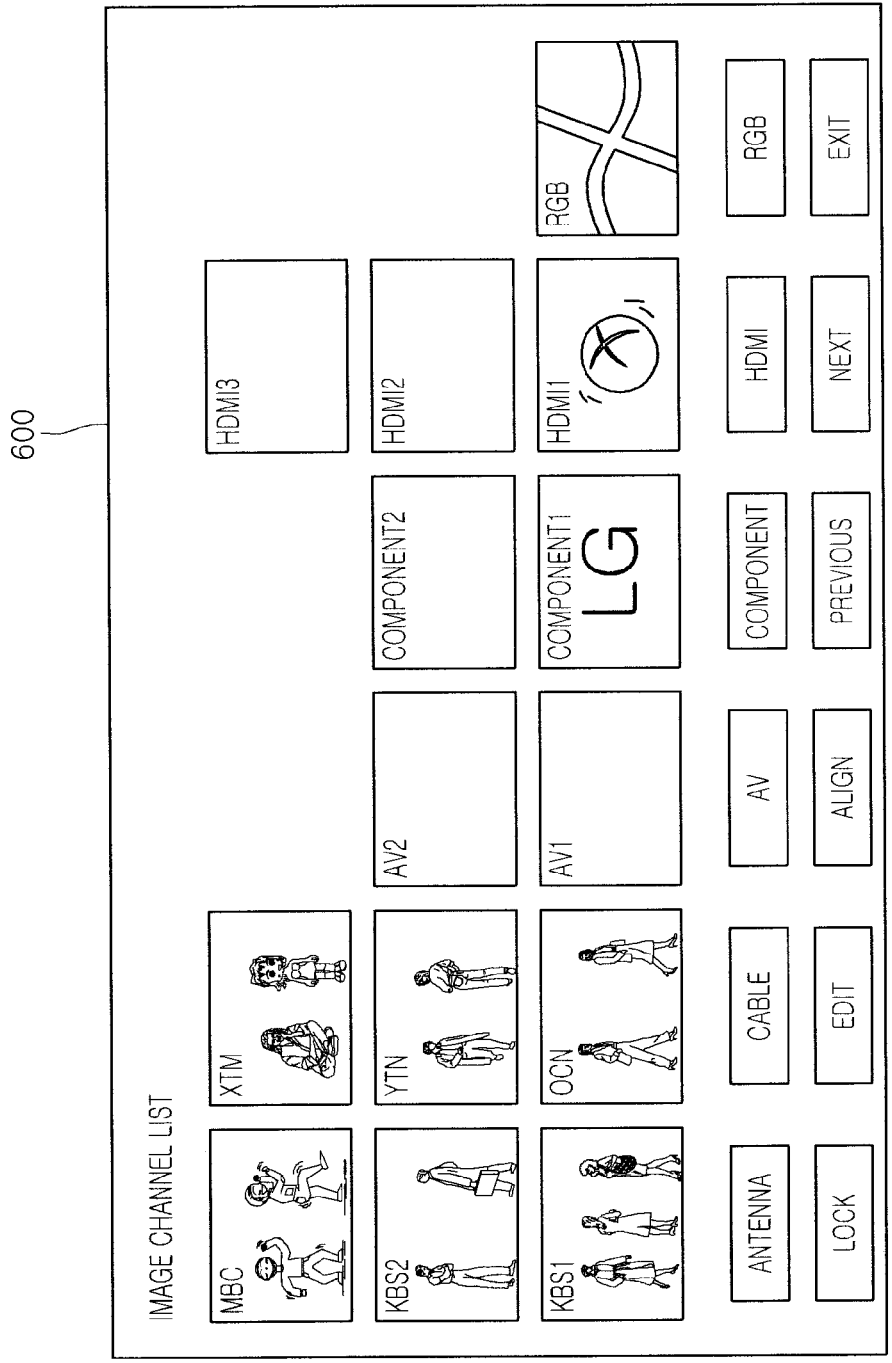
FIG. 11 is a view illustrating another example where a screen is displayed according to an operation of the channel browsing processing circuit of FIGS. 2 and 3 or FIGS. 5 and 6.

FIG. 11 is a view illustrating another example where a screen is displayed according to an operation of the channel browsing processing circuit of FIGS. 2 and 3 or FIGS. 5 and 6. If there is an instruction for an input channel list view, a thumbnail image screen 600 including a thumbnail image corresponding to an external input image can be displayed on the display 180.

As previously described, the apparatus 100 may include Ethernet terminals, USB terminals, CVBS terminals, component terminals, S-video terminals, DVI terminals HDMI terminals, RGB terminals, D-SUB terminals, IEEE 1394 terminals, SPDIF terminals, liquid HD terminals, etc. These terminals may be connected to external input devices. Additionally, the apparatus 100 includes an antenna terminal to receive an air or cable broadcast signal.

The thumbnail images corresponding to the broadcast signal images are aligned and displayed in a cable area and an AV area. Thumbnail images corresponding to external input images from external input devices are aligned and displayed in an AV area, a component area, an HDMI area, and an RGB area.

For example, a thumbnail image corresponding to an air broadcast signal image of a plurality of channels inputted from the antenna can be displayed in the antenna area. A thumbnail image corresponding to a cable signal image of a plurality of channels inputted through the antenna terminal on the apparatus 100 can be displayed in the cable area. A thumbnail image corresponding to at least one external input image inputted from a component terminal can be displayed in the component area. A thumbnail image corresponding to at least one external input image inputted from an HDMI terminal can be displayed in the HDMI area. A thumbnail image corresponding to at least one external input image inputted from an RGB terminal can be displayed in the RGB area. At least one input image inputted from terminals except for the component terminal, the HDMI terminal, and the RGB terminal can be displayed in the AV area.

In this embodiment, the thumbnail image screen 600 including a thumbnail image corresponding to an external input image inputted from the external input device is displayed on the display 180. A user may intuitively and simply recognize whether which external input device is connected to the apparatus 100 and also which external input image is inputted or active.

A thumbnail image corresponding to an air broadcast signal image of channels such as MBC, KBS1, and KBS2 is displayed in the antennal area. Also, a thumbnail image corresponding to a cable broadcast signal image of channels such as XTM, YTN, OCN, etc. is displayed in the cable area. Moreover, a thumbnail image corresponding to an image inputted from component 1, HDMI 1, and RGB terminals represent a connection state of a corresponding external input device, or that there is no external input image from an external input device. Besides, a thumbnail image corresponding to an image inputted from AV1, AV2, component 2, HDMI2, and HDMI3 terminals displays no thumbnail image since corresponding external input devices are not connected.

Accordingly, a user may intuitively and simply recognize which external input device among various external input devices is connected to the apparatus for displaying images, or which external input image is inputted.

A thumbnail image may be displayed at least including information about an external input device. Here, information about an external input device, as shown in the drawing, includes at least one of channel name information such as MBC, KBS, YTN, OCN, etc. received from an external input device, channel number information 11-1, 9-1, 24-1, etc., and input terminal name information of an external device such as AV1, AV2, component 1, component 2, HDMI1, HDMI2, RGB, etc.

In addition, thumbnail images displayed on the image screen 600 are images processed and extracted in the channel browsing processing circuit 170. For example, the images may be at least one of an image extracted from an external input image of an external input device and a broadcast signal image received from an antenna terminal. An operation of the channel browsing processing circuit 170 is the same as above.

In addition, when a thumbnail image corresponding to an external input image of an external input device is displayed, as shown in the drawing, an AV area, a component area, an HDMI area, and an RGB area are aligned and displayed except for an antenna area and a cable area corresponding to a channel list.

Figure 12:
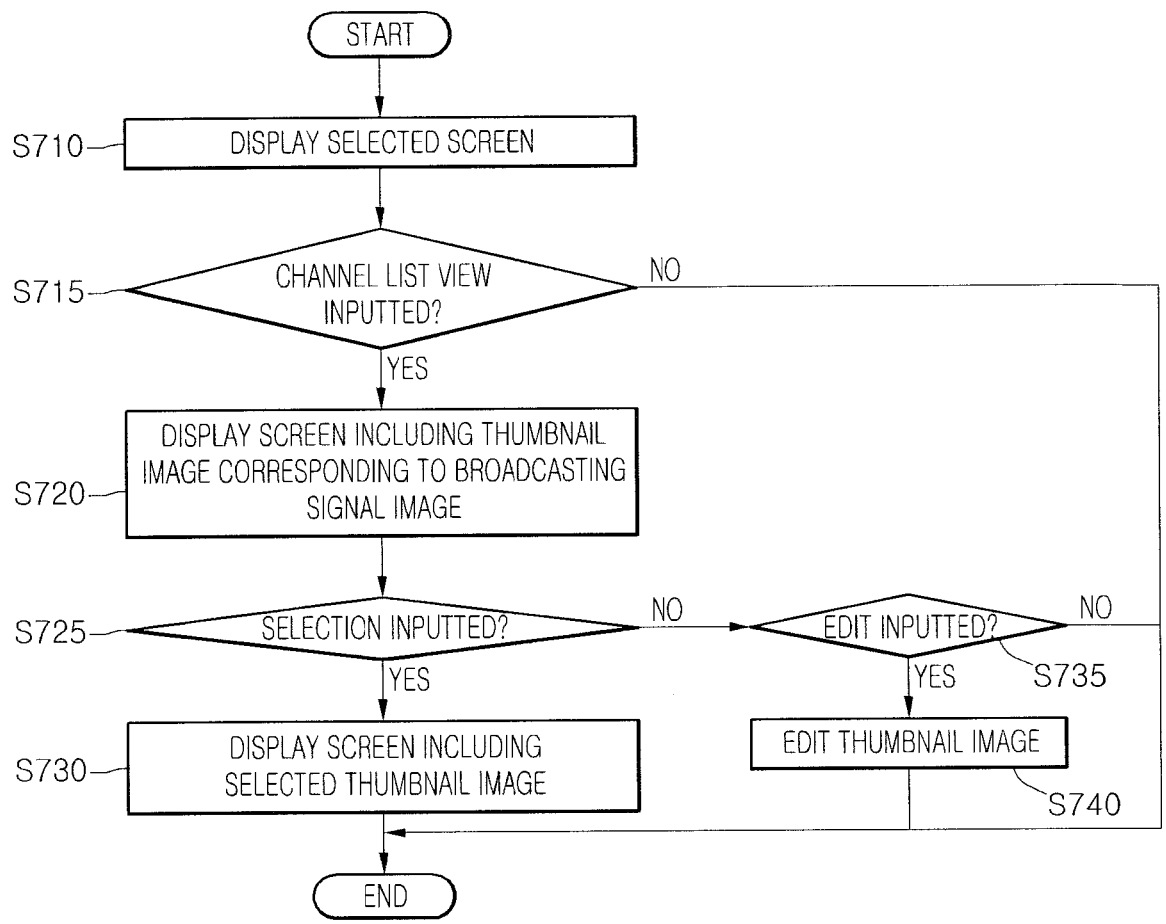
FIG. 12 is a flowchart illustrating an operation method of an image display device according to an embodiment.

FIG. 12 is a flowchart illustrating an operation method of an image display device according to an embodiment. A selected screen is displayed on the display 180 in step S710. The selected screen may be a menu screen, a broadcasting screen, a multimedia playing screen, an external input screen, and a webpage screen.

When the selected screen is displayed in step S710, if there is an instruction of a channel list view in step S715, a thumbnail image screen including a thumbnail image corresponding to a broadcast signal image of the received channel is displayed in step S720. For example, as shown in FIG. 10, the thumbnail image screen 500 corresponding to a broadcast signal image can be displayed on the display 180.

In addition, the thumbnail image corresponding to a broadcast signal image of a received channel may be a thumbnail image corresponding to a broadcast signal image of a pre-stored channel. Through a channel memory function, the pre-stored broadcasting channel is received through the second tuner 125 and then is converted into a thumbnail image to be displayed on the display 180.

If there is a select instruction for one of the displayed thumbnail images, an input image screen corresponding to the selected thumbnail image is displayed on the display 180 in step S730. Moreover, before step S725, it is possible to focus one of the displayed thumbnail images. For example, if there is a focus instruction on one of the displayed thumbnail images, a corresponding thumbnail image can be focused and displayed.

The focus instruction can be performed by a direction key input of a remote or a pointer input of a remote 301. The thumbnail image focused by the direction key input or the pointer input can be focused by at least one of a cursor indication, a highlight indication, and an enlargement indication. When the focused thumbnail image is moved by a direction key input or a pointer input, it can be displayed continuously while moving.

In addition, when the thumbnail image screen 500 including a thumbnail image is displayed on the display 180 in step S720, if there is an edit instruction in step S735, the displayed thumbnail image can be edited in step S740.

For example, when one of the thumbnail images is focused, if there is an edit instruction, the focused thumbnail image can be edited. An edit operation can be performed with various forms such as favorite register, delete register, lock register, etc. of the focused thumbnail image.

FIGS. 13 to 17 are views illustrating various examples of an image channel list view. First, when the selected screen, e.g., an air broadcast signal image screen 800 of a DTV 11-1 channel, is displayed as shown in FIG. 13(a), and if an image channel list is selected using a pointer 805 of the remote 301, a total list of the image channel list is displayed as shown in FIG. 13(b). That is, the thumbnail image screen 810 corresponding to a channel broadcast signal image can be displayed over an entire area of the display 180. Here, if one of the thumbnail images (e.g., CADTV 38-1) is selected by the pointer 805 of the remote 301, as shown in FIG. 13(c), a cable broadcast signal image screen 820 of a channel CADTV 38-1 corresponding to a selected thumbnail image can be displayed on the display 180.

Figure 13:
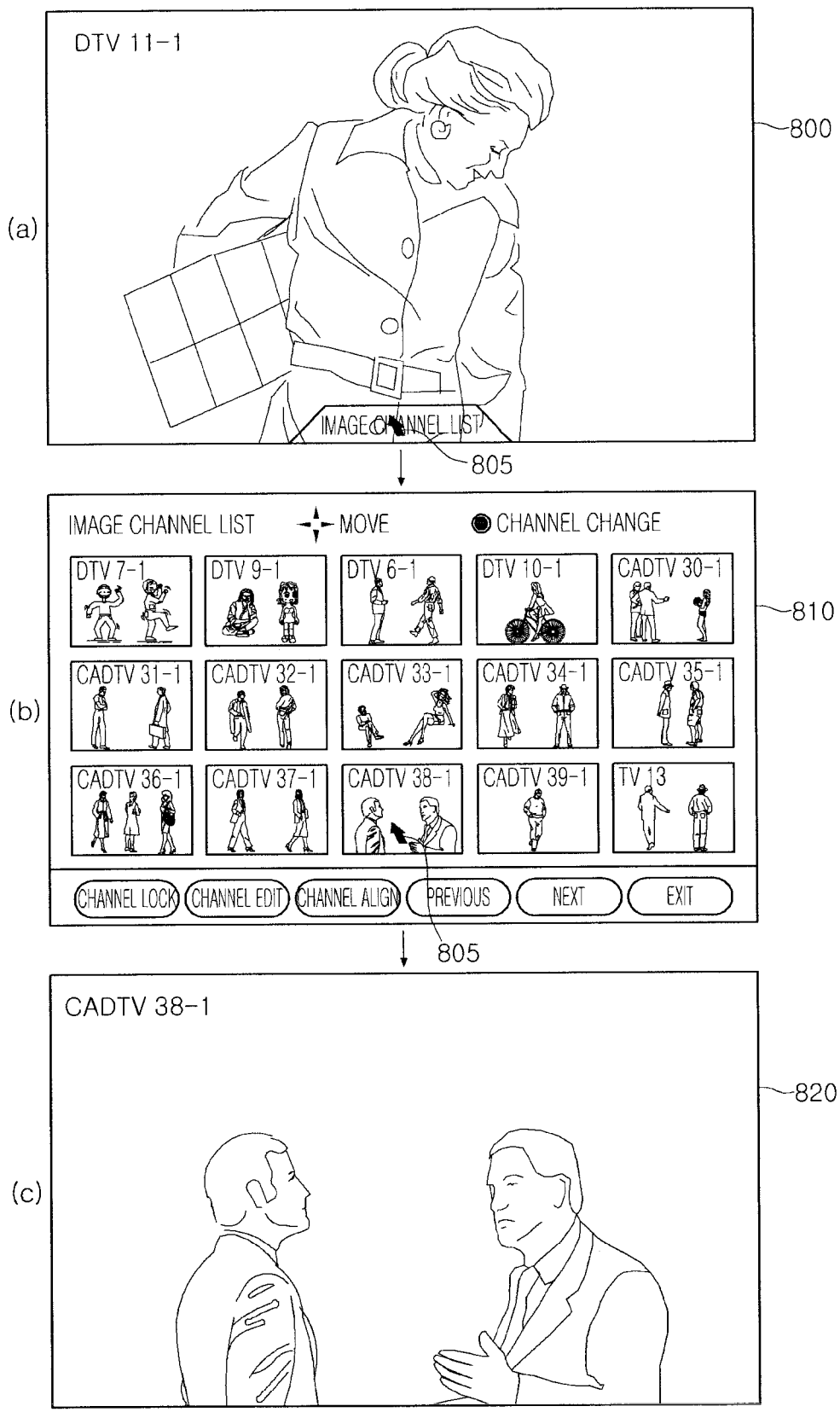
FIGS. 13 to 17 are views illustrating various examples of an image channel list view.
Figure 14:
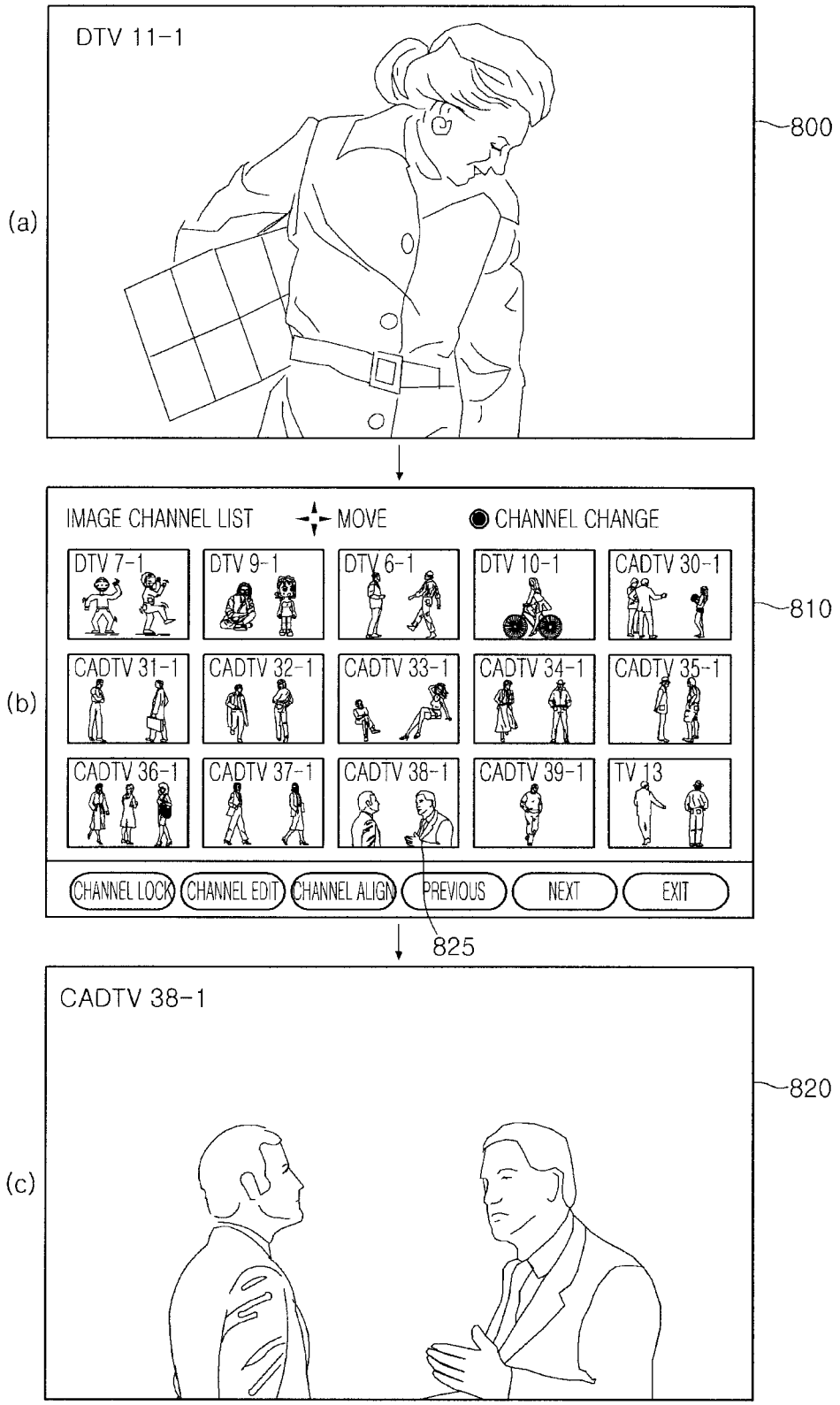

FIG. 14 is almost similar to FIG. 13. There is only a difference in FIG. 14(b) that one of thumbnail images is selected by a cursor 825 of a remote using a direction key, not by the pointer 805 of the remote 301.

When a selected screen as shown in FIG. 15(a), i.e., an air broadcast signal image screen 1000 of a channel DTV 11-1, is displayed, if an image channel list is selected by a pointer 1005 of the motion detective remote 301, as shown in FIG. 15(b), a simple view of the image channel list can be performed. The selected screen 1010 is displayed on a partial area of the display 180, and a thumbnail image screen 1020 corresponding to a channel broadcast signal image can be displayed on the remaining portion of the display 180. One of thumbnail images is selected by the pointer 1025 of the remote 301, as shown in FIG. 15(c), a cable broadcast signal image screen 1030 of a channel CADTV 38-1 corresponding to the selected thumbnail image can be displayed on the display 180.

Figure 15:
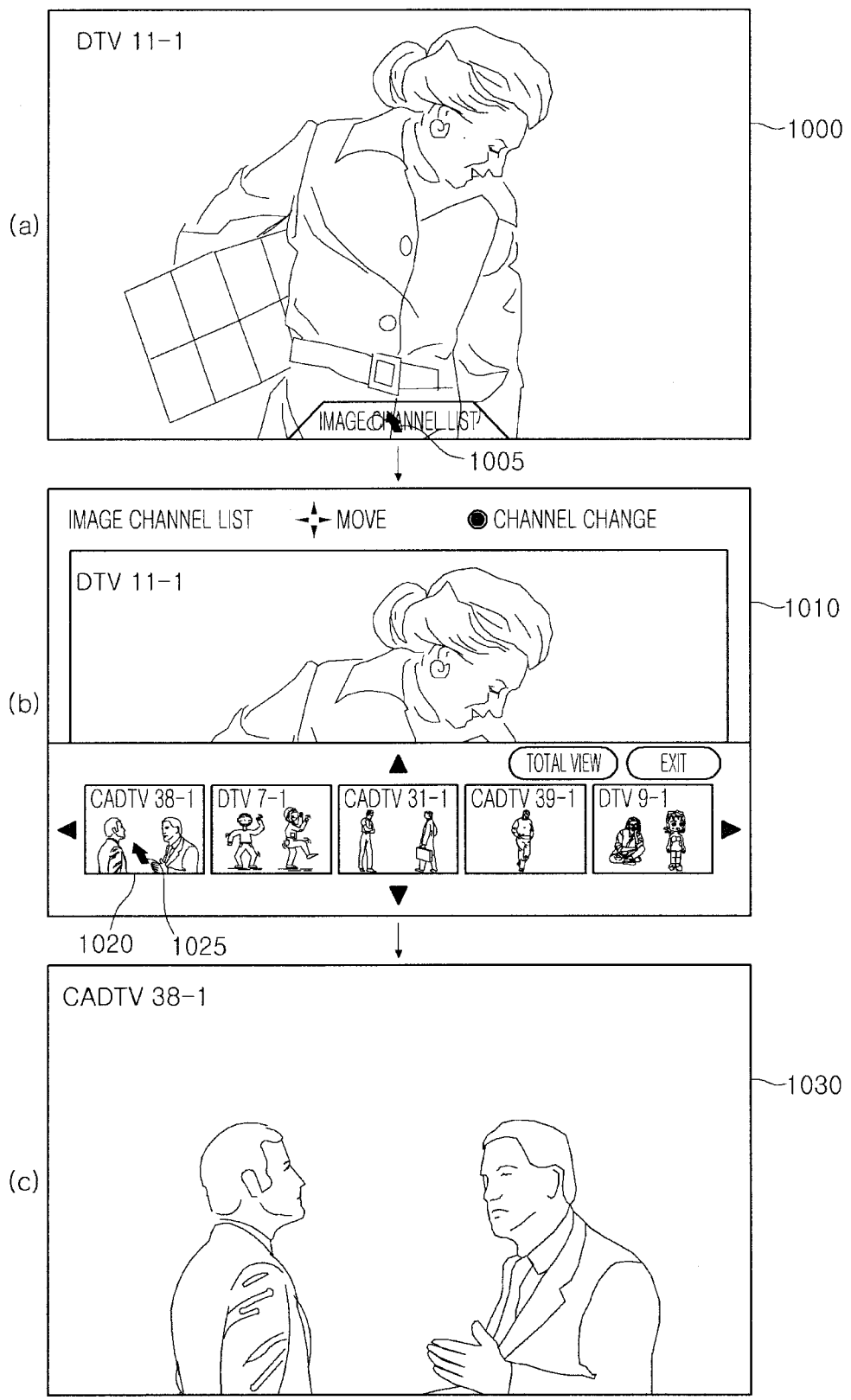
Figure 16:
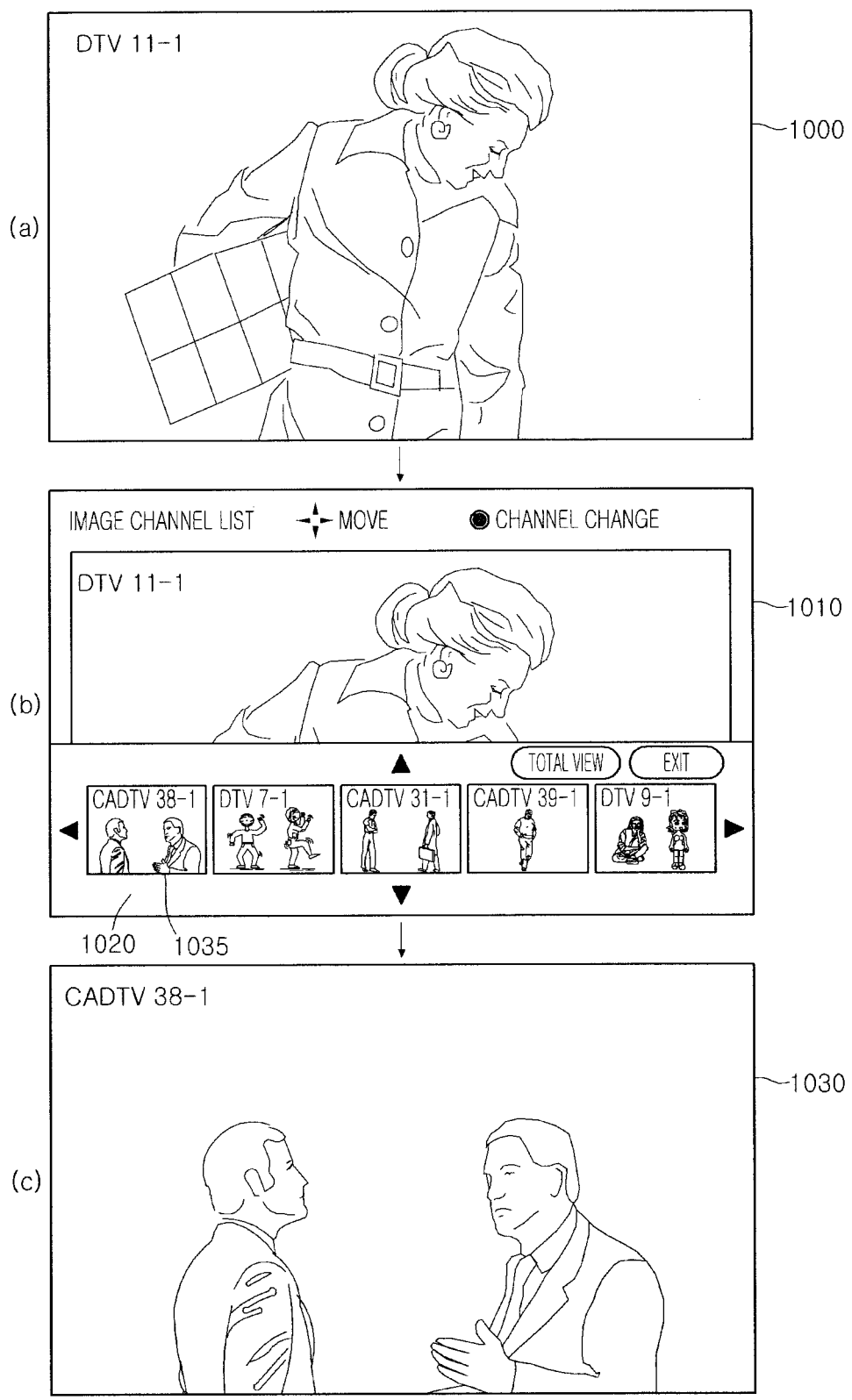
Figure 17:
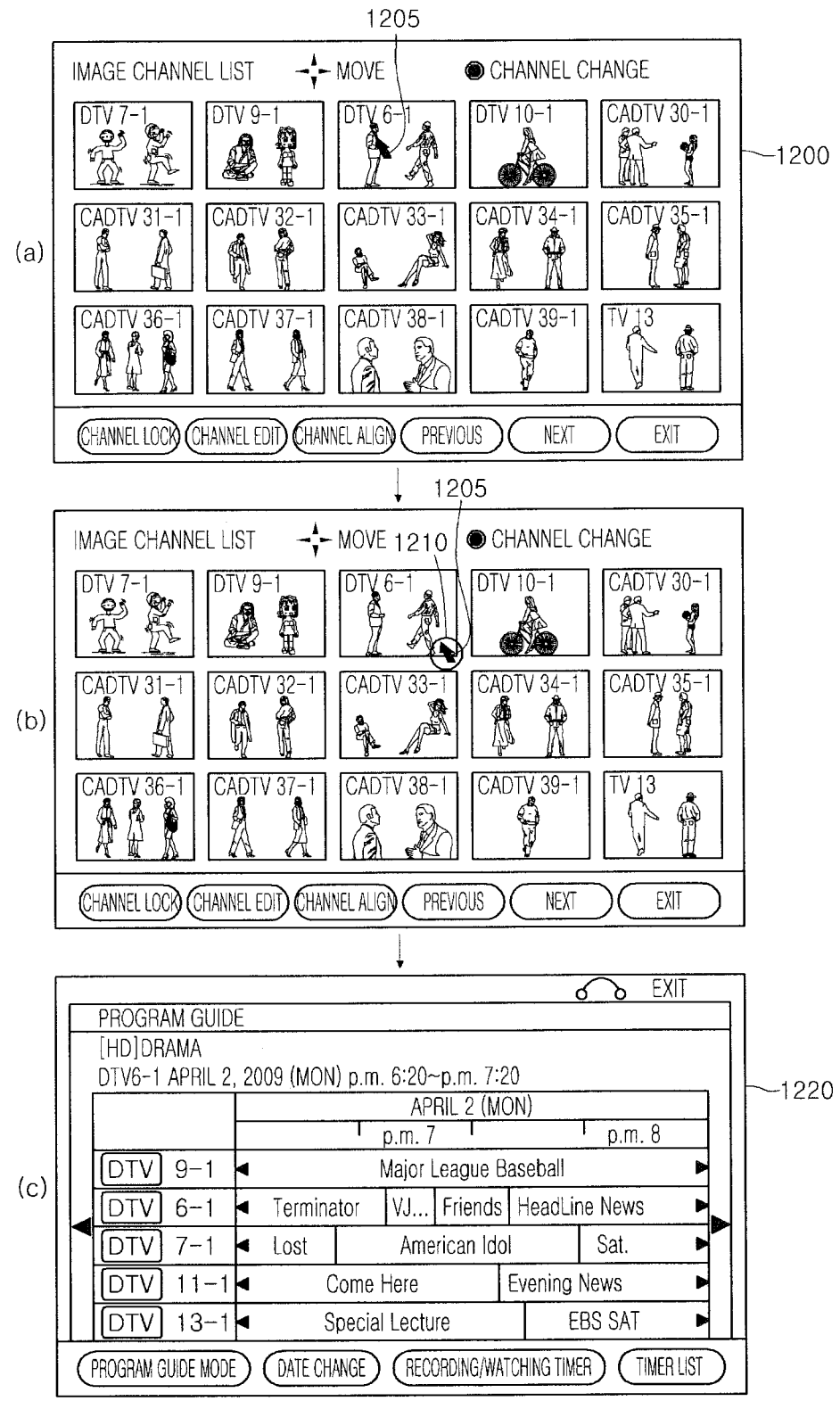

FIG. 16 is almost similar to FIG. 15. There is only a difference in FIG. 16(b) that one of thumbnail images is selected by a cursor 1035 of a remote using a direction key, not by the pointer 1005 of the remote 301.

FIG. 17(a) is a view illustrating a thumbnail image screen 1200 corresponding to a channel broadcast signal image over an entire area of the display 180. When a total view of an image channel list is performed, if one of the thumbnail images is focused by a pointer 1205 of the remote 301 or there is an information view instruction, as shown in FIG. 17(b), an icon 1210 indicating "information" can be displayed on the focused thumbnail image. The icon 1210 is selected or focused by the pointer 1205 of the motion detective remote 301, as shown in FIG. 17(c), a program information screen 1220 including program information of a channel corresponding to the selected thumbnail image can be displayed on the displayed 180.

The program information may include at least one of a start time, an end time, and a rating of a current broadcasting program of a corresponding channel, a previous broadcasting program, and the next broadcasting program. The program information screen 1220 may also include program information of other channels besides the selected channel.

The selection of the icon 1210 is performed by the pointer 1205 of the remote 301, but is not limited thereto. As mentioned above, it is possible to select the icon 1210 using a cursor of the remote through a direction key. Further, it is apparent to those skilled in the art that a select or focus operation may be performed by the pointer 1205 of the remote 301, but is not limited thereto. That is, it is possible to use a cursor of a remote through a direction key.

Figure 18:
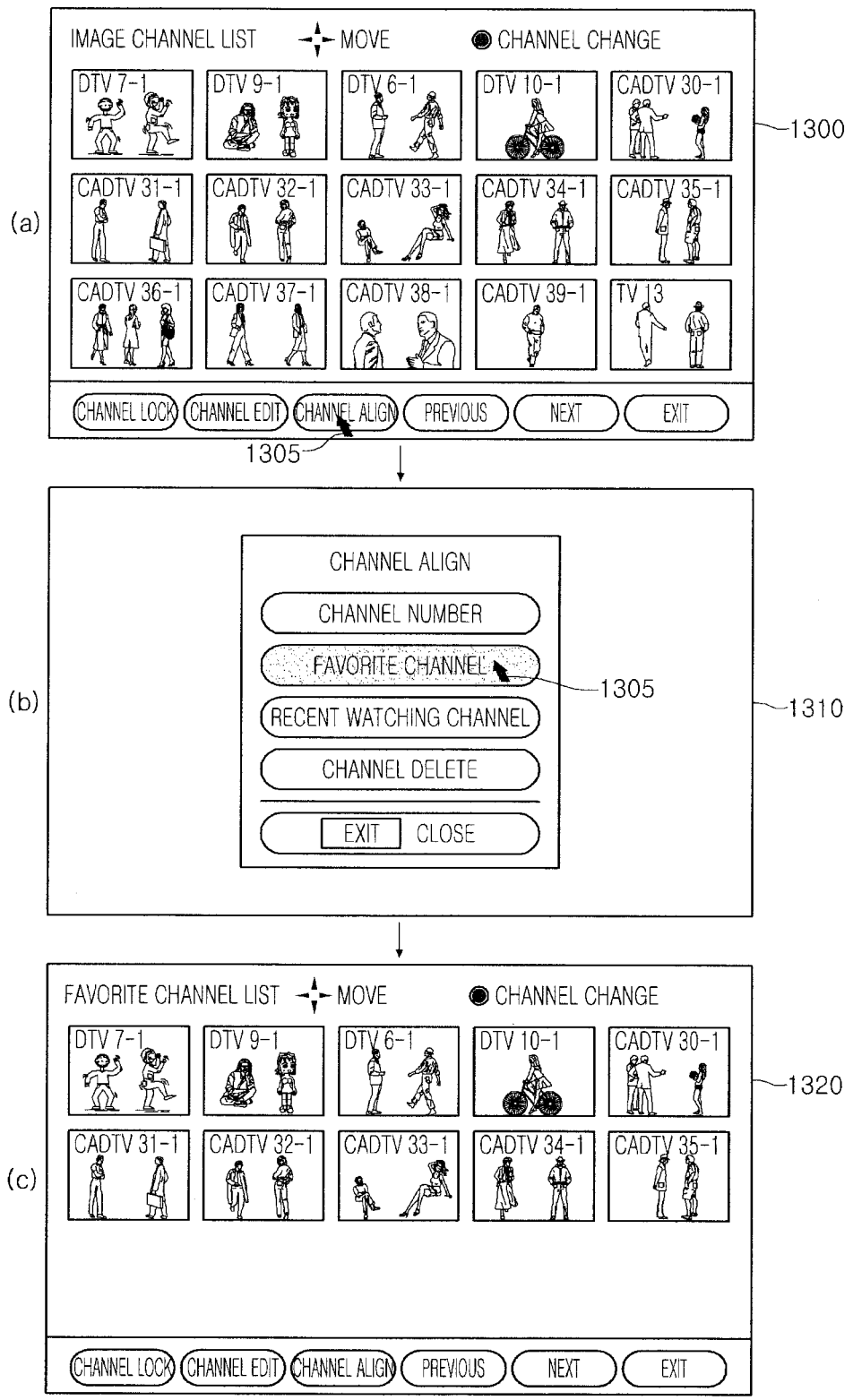
FIGS. 18 to 20 are views illustrating various examples of a channel align when an image channel list is displayed.
Figure 19:
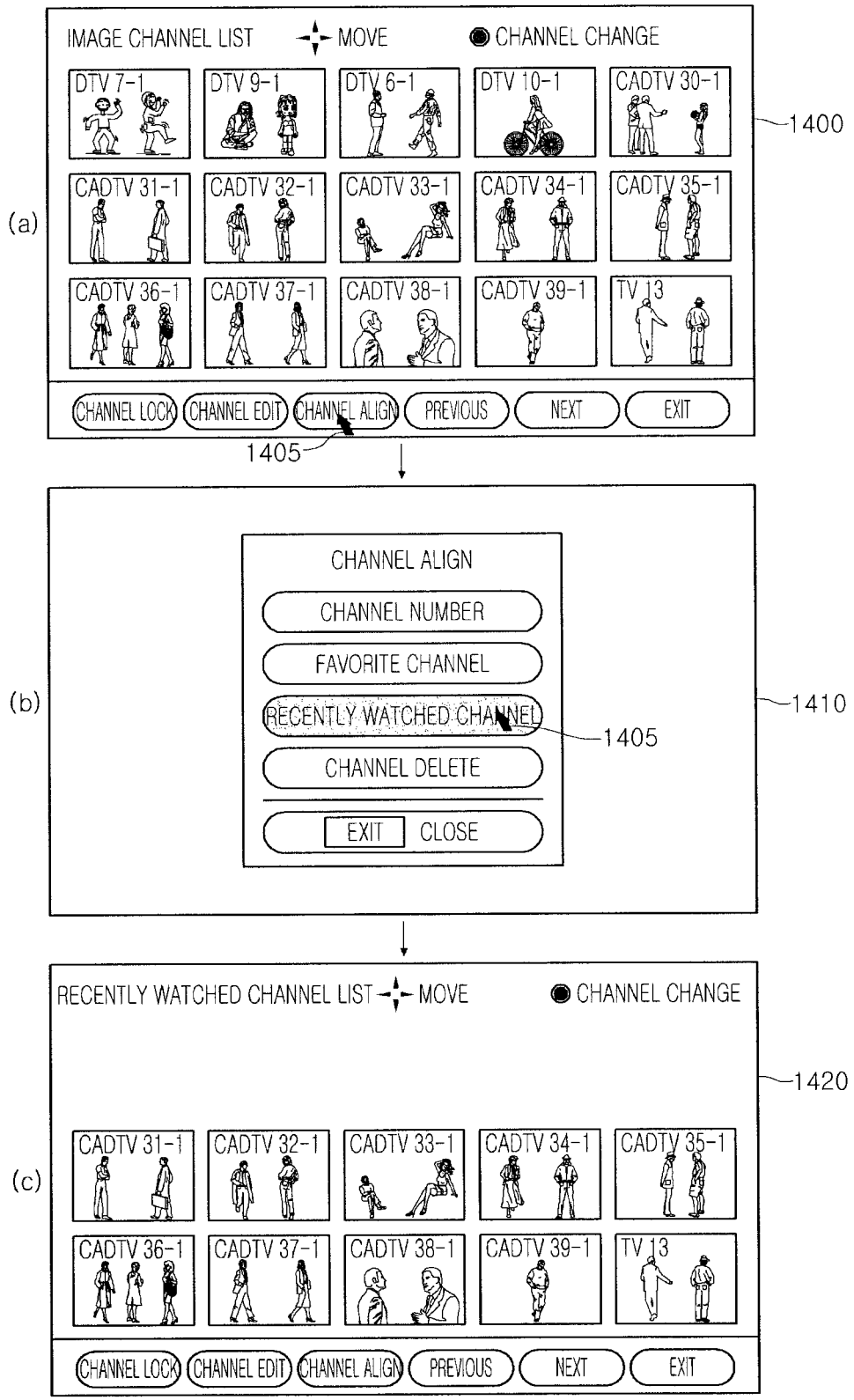
Figure 20:
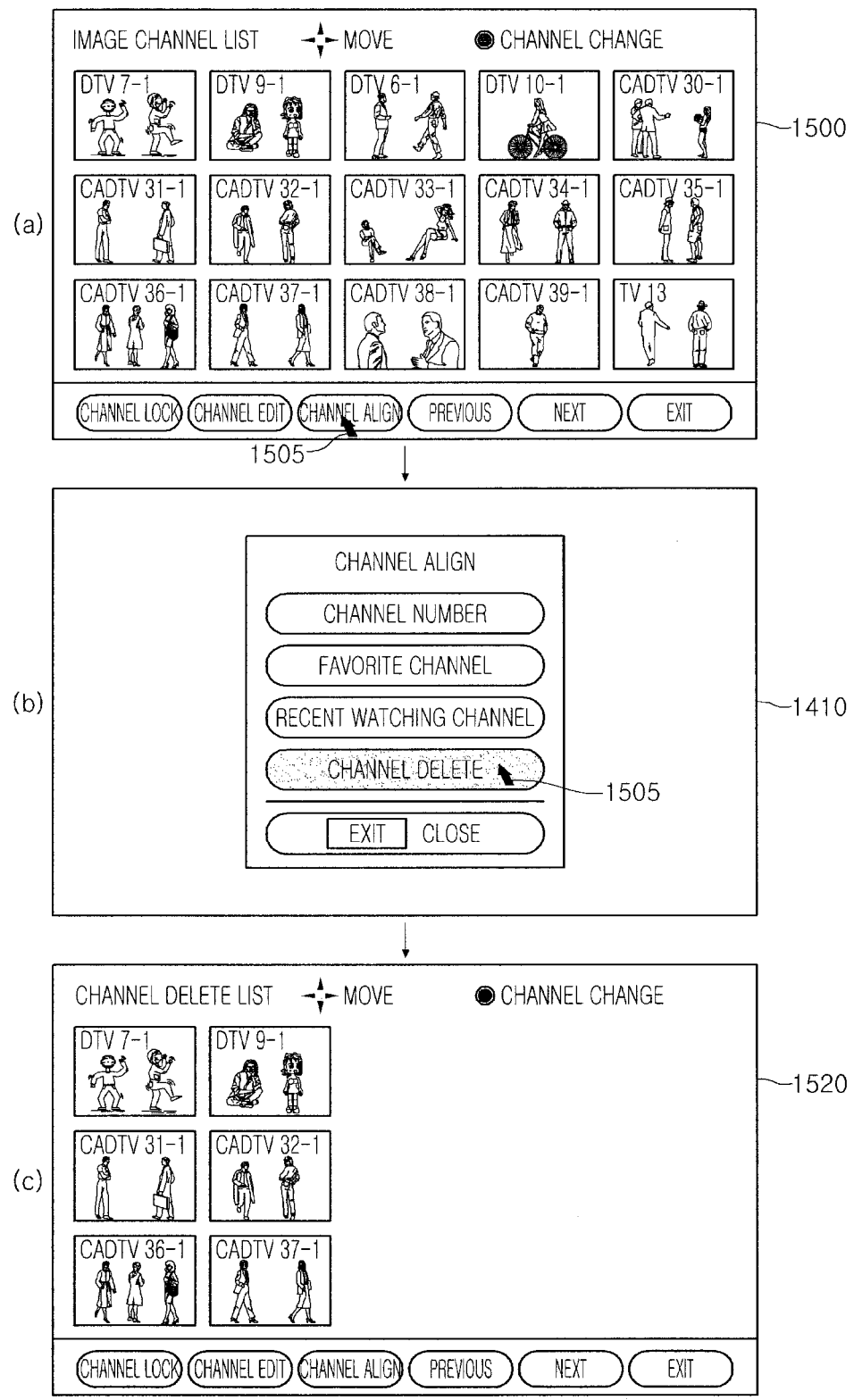

FIGS. 18 to 20 are views illustrating various examples of a channel align when an image channel list is displayed.

FIG. 18(a) is a view illustrating a thumbnail image screen 1300 corresponding to a channel broadcast signal image over an entire area of the display 180. When a total view of an image channel list is performed, if a "channel align" item is selected by the pointer 1305 of the remote 301, as shown in FIG. 18(b), a channel align item screen 1310 including a "channel number" item, a "favorite channel" item, a "recent witching channel" item, and a "delete channel" item can be displayed. Among them, if the pointer 1305 of the motion detective remote 301 selects the "favorite channel" item, as shown in FIG. 18(c), a preference channel screen 1320 including a thumbnail image corresponding to a registered favorite channel can be displayed on the display 180.

FIG. 19 is almost similar to FIG. 18, but there is a difference that when the pointer 1405 of the motion detective remote 301 selects a "recently watched channel" item, as shown in FIG. 19(c), a recently watched channel screen 1420 including thumbnail images corresponding to a registered watched channel can be displayed on the display 180.

Next, FIG. 20 is almost similar to FIG. 18. There is only a difference that when a pointer 1505 of the remote 301 selects a "channel delete" item, as shown in FIG. 20(c), a channel delete screen 1520 including thumbnail images corresponding to registered and deleted channels can be displayed on a display 180.

FIGS. 21 to 24 are views illustrating various examples of channel edit when an image channel list is displayed.

FIG. 21(a) illustrates a thumbnail image screen 1600 corresponding to channel broadcast signal images over an entire area of the display 180. When a total view of an image channel list is performed, if the pointer 1605 of the remote 301 selects a "channel edit" item, as shown in FIG. 21(b), a channel edit screen 1610 including thumbnail images can be displayed on the display 180.

Among them, when the pointer 1605 of the remote 301 selects one of the thumbnail images, as shown in FIG. 21(c), a channel edit item screen 1620 including a "watching" item, a "favorite channel register" item, a "lock" item, and a "delete" item can be displayed. Among them, when the pointer 1605 of the remote 301 selects the "favorite channel register" item, as shown in FIG. 23(d), a favorite channel register screen 1630 can be displayed on the display 180.

Figure 21:
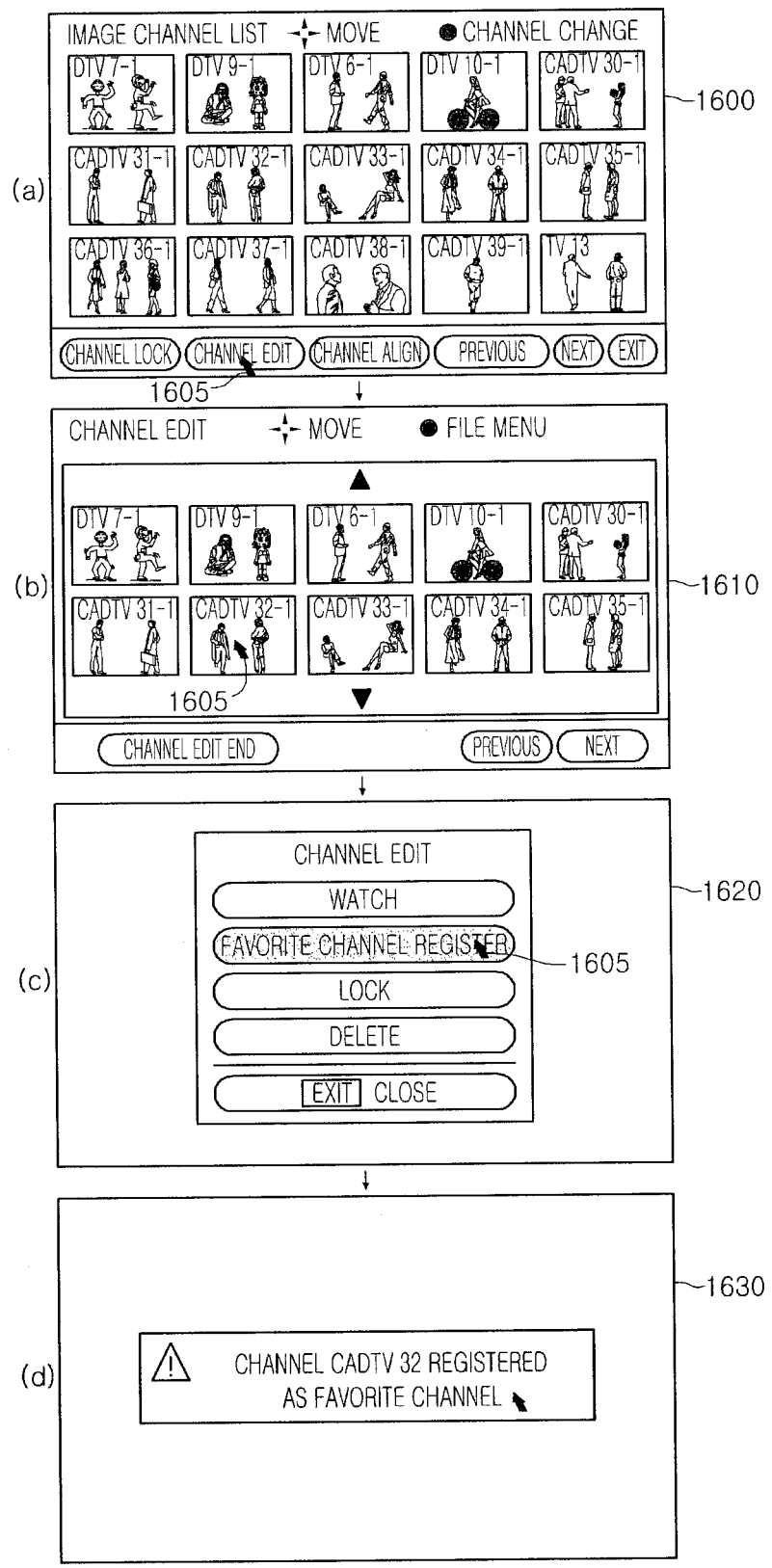
Figure 22:
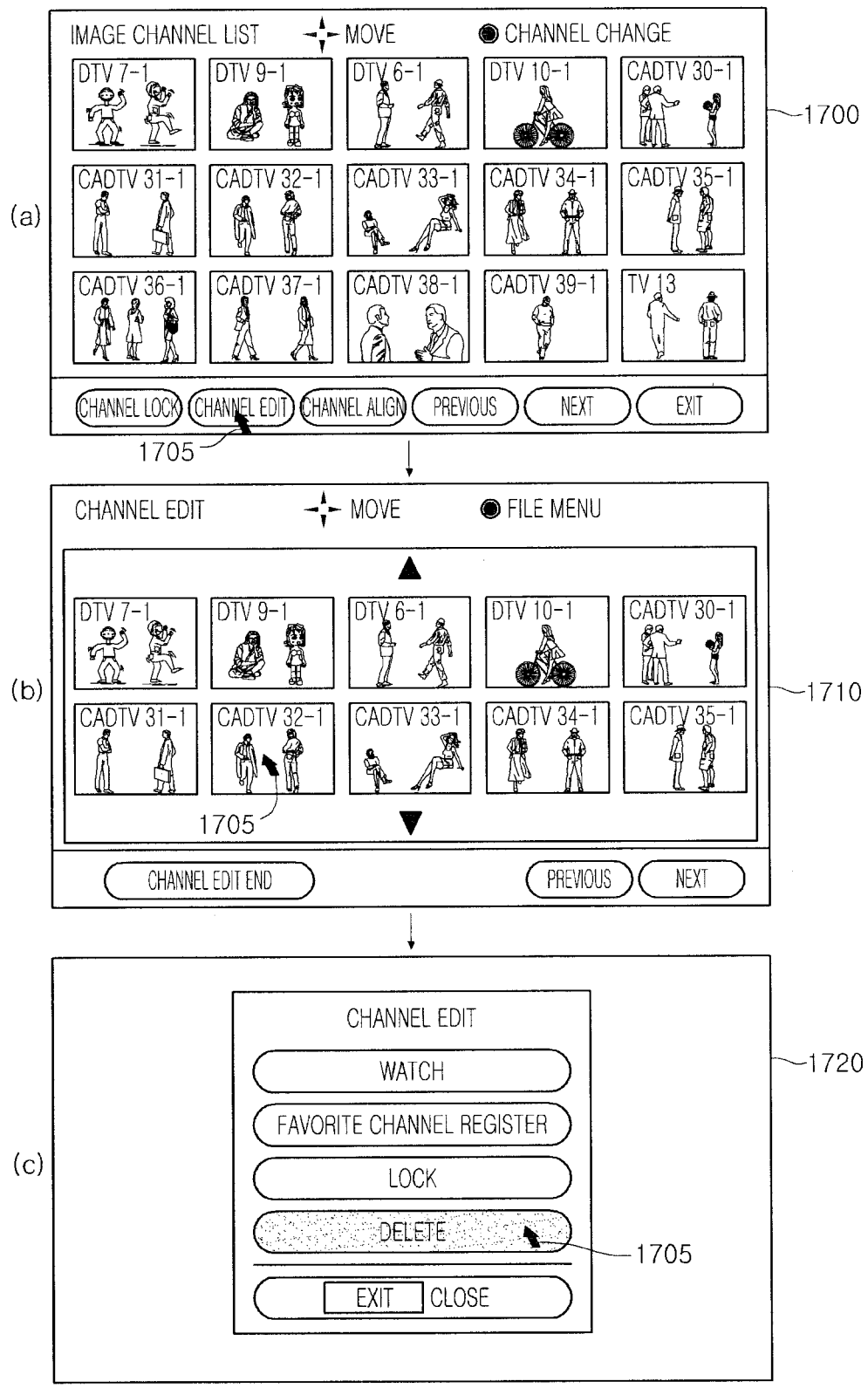
Figure 23:
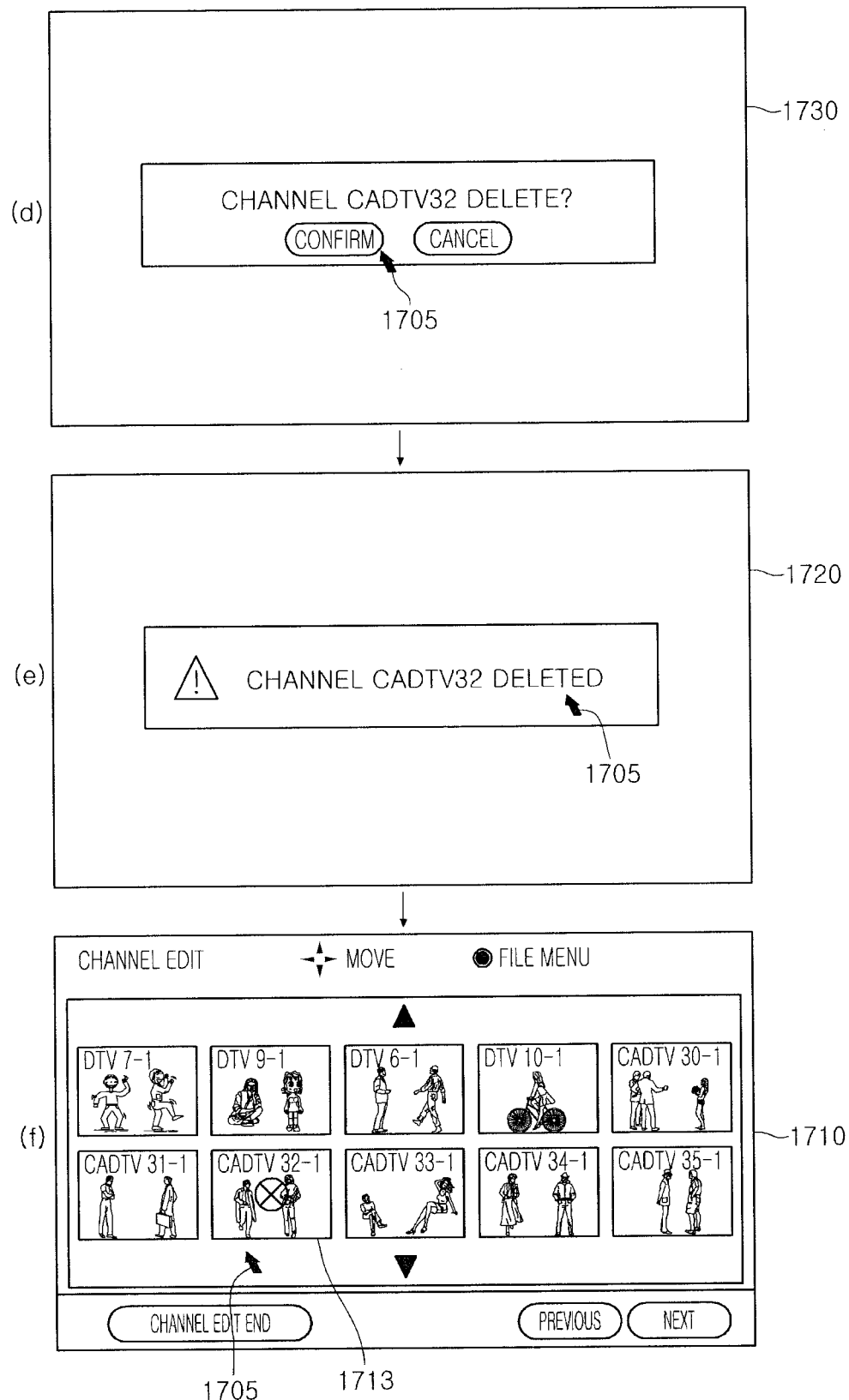

Next, FIGS. 22 and 23 are combined to constitute one drawings and the combination thereof is almost similar to FIG. 21. When a pointer 1705 of the remote 301 selects a "delete" item in a channel edit item screen 1720, as shown in FIG. 23(d), a delete confirmation screen 1730 can be displayed. When the pointer 1705 of the remote 301 selects a delete confirmation item, as shown in FIG. 23(e), a channel delete completion screen 1740 can be displayed on the display 180.

In addition, a registered deleted thumbnail image 1713, as shown in FIG. 23(f), is displayed in the channel edit screen 1710, but at least one of brightness, contrast, fade, or transparency of the registered deleted thumbnail image 1713 can be changed and displayed. Further, an icon may be provided since the registered and deleted thumbnail image 1713 is displayed being distinguished from other thumbnail images, a user intuitively recognizes that the corresponding thumbnail image 1713 is the deleted thumbnail image.

Figure 24:
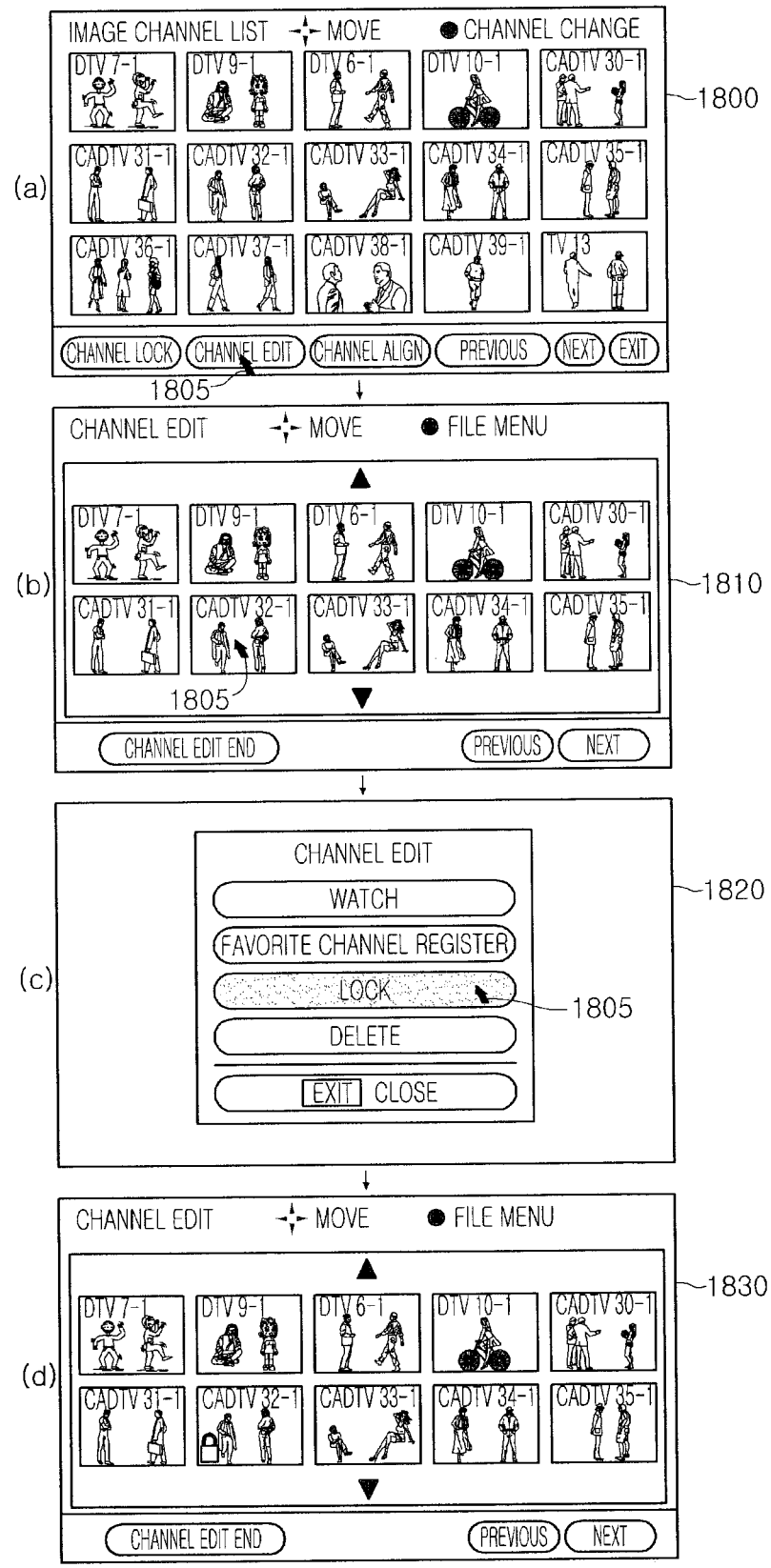

Next, FIG. 24 is almost similar to FIGS. 22 and 23. A pointer 1805 of the remote 301 selects a "lock" item, as shown in FIG. 24(d), a lock channel screen 1830 including a thumbnail image corresponding to a registered lock channel can be displayed on the display 180.

Figure 25:
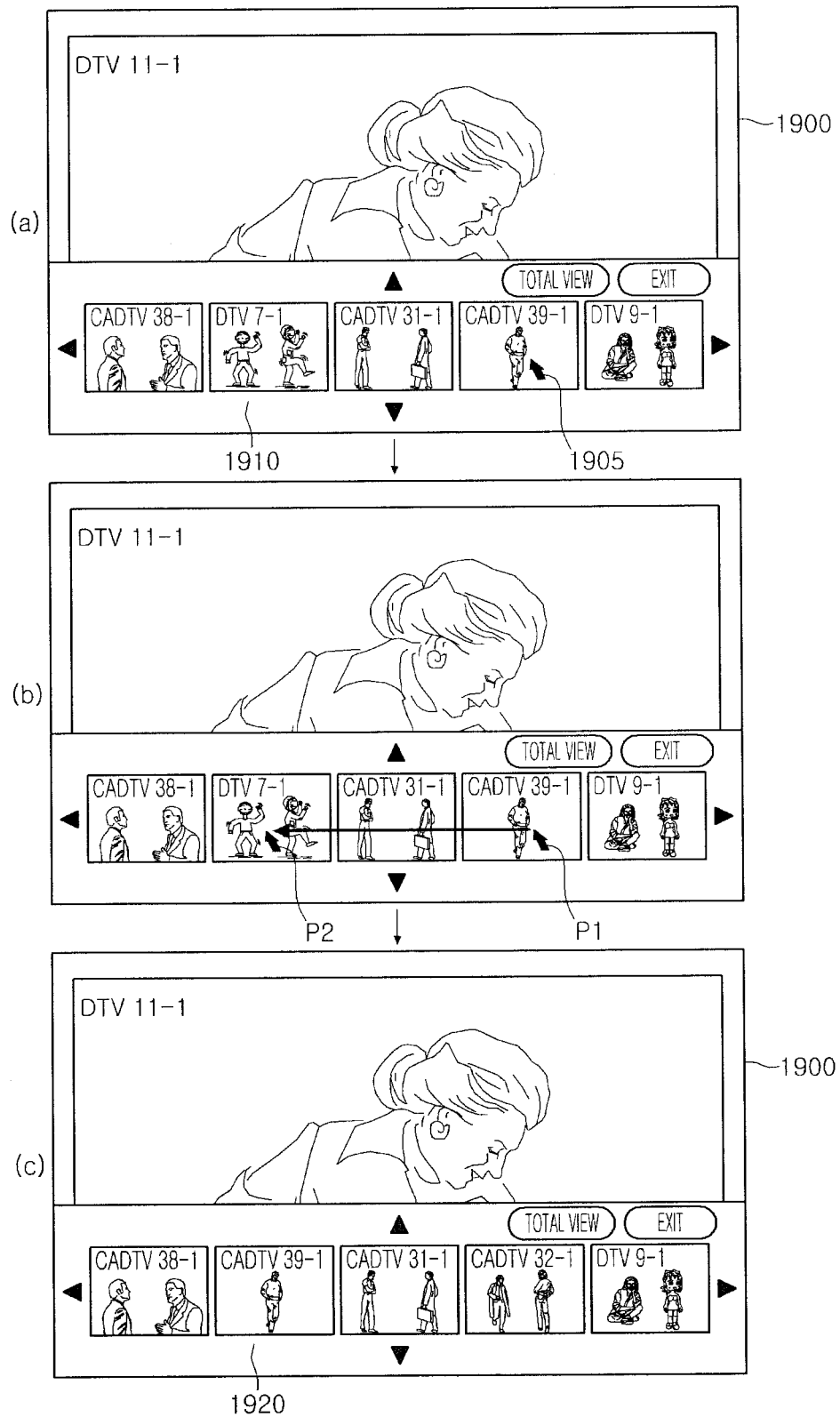
FIGS. 25 and 26 are views illustrating various examples of the next screen view or a previous screen view when an image channel list is displayed.
Figure 26:
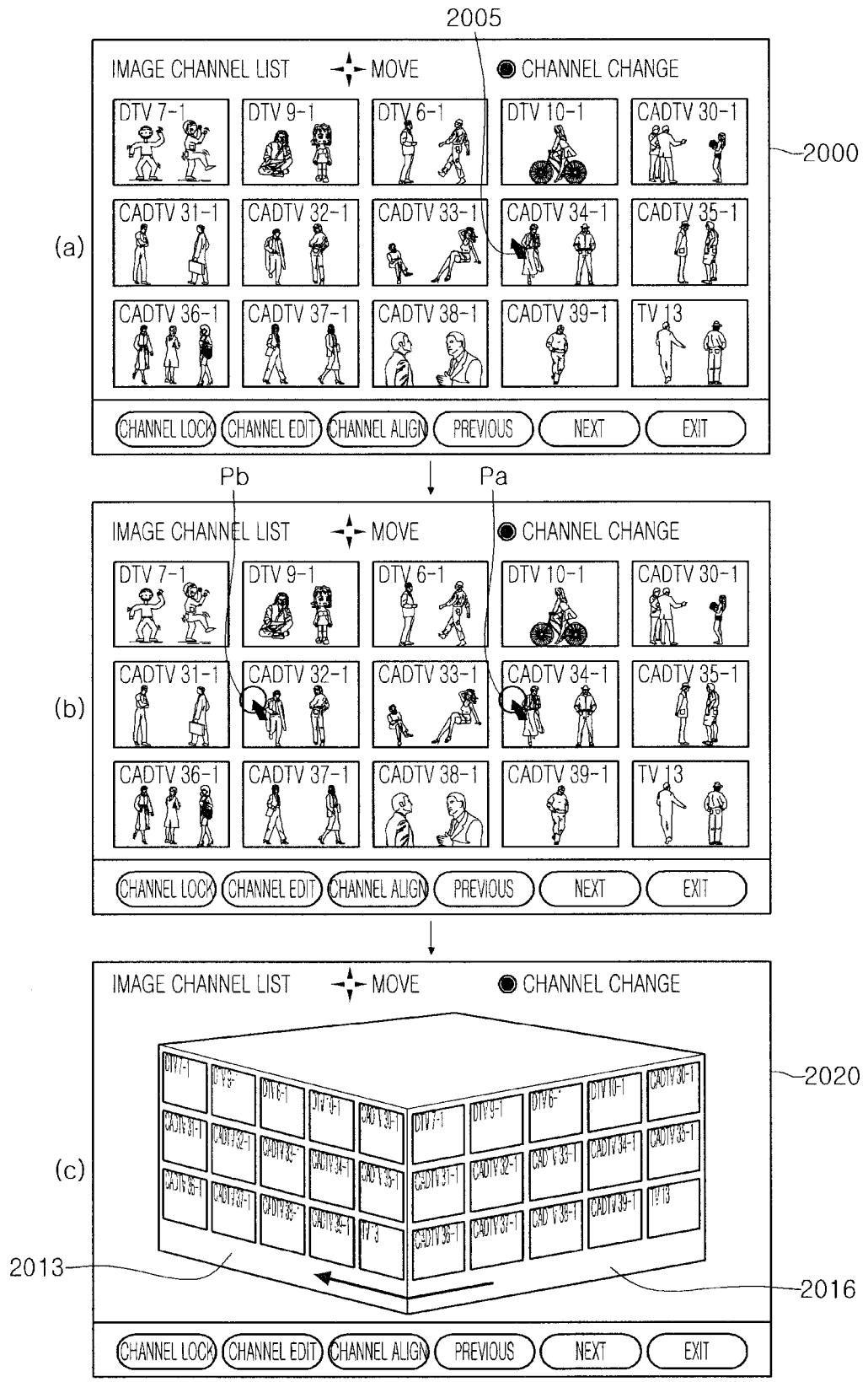

FIGS. 25 and 26 are views illustrating various examples of the next screen view or a previous screen view when an image channel list is displayed.

FIG. 25(a) is a view that a selected screen 1900 is displayed on a portion of the display 180 and a thumbnail image screen 1910 corresponding to channel broadcast signal images is displayed on the remaining area of the display 180. When a simple view of the image channel list is performed, as shown in FIG. 25(b), after a pointer 1905 of the remote 301 is focused on one point P1 among thumbnail images, if the pointer 1905 is dragged to another point P2, as shown in FIG. 25(c), a thumbnail image screen 1920 where a new thumbnail image is dragged can be displayed on the display 180. Accordingly, a user can display another thumbnail image (not shown in a current screen) can be displayed on the display 180 without difficulties.

FIG. 26(a) is a view illustrating a thumbnail image screen 2000 corresponding to channel broadcast signal images over an entire area of a display 180. When a total view of the image channel list is performed, as shown in FIG. 26(b), after a pointer 2005 of the motion detective remote 301 is focused on one point Pa among thumbnail images and then the point Pa is dragged to another point Pb, as shown in FIG. 26(c), a thumbnail image screen 2020 where a new thumbnail image is dragged can be displayed on the display 180. A first area 2013 in the thumbnail image screen 2020 is an area corresponding to the previous thumbnail image screen 2000 that is displayed on the display 180 before, and the second area 2016 is an area corresponding to a new thumbnail image screen that is displayed on the display 180 newly. Accordingly, a user can display another thumbnail image (not displayed in one screen) on the display 180.

If any of the embodiment disclosed above, a still image thumbnail may change to a moving image thumbnail when the still image thumbnail is selected.

The configurations and methods of the above-mentioned embodiments are not applied, with limitation, to an apparatus for displaying images and an operating method thereof according to an embodiment. The entirety or a part of embodiments can be selectively combined for configurations such that various modifications can be provided.

In addition, the operating method of an apparatus for displaying images can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a tuner configured to receive a radio frequency broadcast signal corresponding to a channel selected by a user or broadcast channels that are pre-stored in a storage device through an antenna;
an external signal input unit connected to an external device and configured to transmit an external input image signal, an external input sound signal, and an external input data signal into a controller;
an interface unit configured to transmit a user input signal and a remote control device signal; and
a channel browsing processing circuit configured to perform browsing processing with respect to at least one of a broadcast signal that corresponds to a received channel or at least one of a plurality of input image signals inputted through the external signal input unit, wherein the controller is configured to control display of the channel browsing and to process a first thumbnail image screen including a thumbnail image corresponding to an external input image or a tuner input and a menu for arranging or editing of the thumbnails in a display unit and to process a second thumbnail image screen including a thumbnail image corresponding to the external input image or the tuner input based on a user input signal, and wherein the display unit is configured to display a channel list view the first and second thumbnail image screen including a thumbnail image, an editing menu and an arranging menu according to the control of the controller, wherein the second thumbnail image screen includes at least one of different thumbnail images from the first thumbnail image screen.

2. The display device of claim 1, wherein the controller is configured to display the thumbnails including input terminal information, and wherein the display unit is configured to display the thumbnail images corresponding to the broadcast signal images aligned and displayed in a cable area and an AV area and antenna area, or external input images from external input devices aligned and displayed in the AV area, a component area, an HDMI area or an RGB area.

3. The display device of claim 2, wherein the controller is configured to display the input terminal information when there is no external input image from an external input device connected thereto.

4. A method for displaying a thumbnail image in an image display device, the method comprising:
receiving an image channel list view command from a user;
displaying a first image channel list including at least one thumbnail image corresponding to a broadcast signal image or an external input signal image over an entire area or a partial area of a display unit, the first image channel list including a channel editing menu for receiving a new image channel list view command from the user; and
displaying a second image channel list including at least one thumbnail image corresponding to the broadcast signal image or the external input signal image over the entire area or the partial area of the display unit, the second image channel list including the channel editing menu and a channel arranging menu,
wherein the second image channel list includes at least one of different thumbnail images from the first image channel list.

5. The method according to claim 4, further comprising:
displaying icon indicating information when an information view command is input by the user or one of the thumbnail images is focused by a pointer of a remote controller;
selecting the displayed icon; and
displaying program information corresponding to the selected icon in response to a signal selecting the icon.

6. The method according to claim 4, wherein the program information includes a program start time, an end time, a rating or a current broadcasting program of a corresponding channel, a previous broadcasting program, or the next broadcasting program.

7. The method according to claim 4, further comprising:
displaying a sub menu for channel arranging in response to selection of the channel arranging menu;
selecting one of a plurality of selection items of the sub menu;
displaying a thumbnail image corresponding to the selected sub menu item for channel arranging, the plurality of selection items of the sub menu for channel arranging including a channel number item, favorite channel item, recently watched channel item and channel delete item.

8. The method according to claim 4, further comprising displaying a preference channel screen including a thumbnail image corresponding to a registered favorite channel in response to selection of the favorite channel item by the user.

9. The method according to claim 8, further comprising displaying a recently watched channel screen including thumbnail images corresponding to a registered watched channel in response to selection of the recently watched channel item by the user.

10. The method according to claim 8, further comprising displaying a channel delete screen including thumbnail images corresponding to registered and deleted channels in response to selection of the channel delete item by the user.

11. The method according to claim 4, further comprising:
displaying a sub menu for channel editing;
selecting one of a plurality of items of the sub menu for channel editing;
displaying the thumbnail image corresponding to the selected sub menu item for channel editing, the plurality of items of the sub menu for channel editing including a watching item, a favorite channel register item, a lock item and a delete item.

12. The method according to claim 11, further comprising displaying a favorite channel register screen in response to selection of the favorite channel register item.

13. The method according to claim 11, further comprising displaying a deletion confirmation screen in response to selection of the delete item, and displaying a channel delete completion screen after selecting the delete confirmation item.

14. The method according to claim 13, further comprising changing and displaying the registered deleted thumbnail image while altering at least one of brightness, contrast, fade or transparency of the registered deleted thumbnail image.

15. The method according to claim 11, further comprising displaying a lock channel screen including a thumbnail image corresponding to a registered lock channel in response to selection of the lock item by the user.

16. The method according to claim 4 wherein the receiving a new image channel list view command includes:
selecting the at least one thumbnail image from the displayed image channel list; and
dragging the selected thumbnail image to another thumbnail image on the image channel list.

* * * * *